United States Patent
Cao et al.

(10) Patent No.: US 12,137,079 B2
(45) Date of Patent: Nov. 5, 2024

(54) DOCUMENT TRACKING METHOD, GATEWAY DEVICE, AND SERVER

(71) Applicant: Huawei Technologies Co., Ltd., Shenzhen (CN)

(72) Inventors: Jingyun Cao, Hangzhou (CN); Wenqing Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 629 days.

(21) Appl. No.: 17/225,538

(22) Filed: Apr. 8, 2021

(65) Prior Publication Data

US 2021/0258283 A1   Aug. 19, 2021

Related U.S. Application Data

(63) Continuation of application No. PCT/CN2019/108608, filed on Sep. 27, 2019.

(30) Foreign Application Priority Data

Oct. 9, 2018   (CN) .......................... 201811171153.7

(51) Int. Cl.
*H04L 29/06* (2006.01)
*H04L 9/32* (2006.01)
(Continued)

(52) U.S. Cl.
CPC ........ *H04L 63/0209* (2013.01); *H04L 9/3239* (2013.01); *H04L 63/1491* (2013.01);
(Continued)

(58) Field of Classification Search
CPC ............ H04L 63/0209; H04L 63/1491; H04L 67/63; H04L 67/02; H04L 9/3239; H04W 12/121

See application file for complete search history.

(56) References Cited

U.S. PATENT DOCUMENTS 6,643,696 B2    11/2003   Davis et al.
7,152,116 B1 *  12/2006   Austin ................... H04L 61/30
                                                    709/245

(Continued)

FOREIGN PATENT DOCUMENTS

CN          1251669 A       4/2000
CN        101025773 A       8/2007
(Continued)

OTHER PUBLICATIONS

FB customer service, "Detailed analysis of CIA confidential document tracking tool Scribbles," Tencent Cloud, Feb. 24, 2018, with an English machine translation, 17 pages.

(Continued)

*Primary Examiner* — Vance M Little
(74) *Attorney, Agent, or Firm* — Conley Rose, P.C.

(57) ABSTRACT

A document tracking method, a gateway device, and a server, where the gateway device intercepts a first data flow from a first terminal device in an internal network to a second terminal device in an external network, inserts a first Uniform Resource Locator (URL) into a first document in the first data flow to obtain a second data flow that includes a second document, and sends the second data flow to the second terminal device.

20 Claims, 14 Drawing Sheets

(51) Int. Cl.
*H04L 9/40* (2022.01)
*H04L 67/02* (2022.01)
*H04L 67/63* (2022.01)
*H04W 12/121* (2021.01)

(52) U.S. Cl.
CPC .............. *H04L 67/02* (2013.01); *H04L 67/63* (2022.05); *H04W 12/121* (2021.01)

(56) References Cited

U.S. PATENT DOCUMENTS

| | | | |
|---|---|---|---|
| 7,734,722 | B2 | 6/2010 | Seidl et al. |
| 8,549,643 | B1 | 10/2013 | Shou |
| 9,419,851 | B1* | 8/2016 | Dyson ................... H04L 69/161 |
| 2004/0162876 | A1* | 8/2004 | Kohavi ................... G06F 16/90 |
| | | | 709/229 |
| 2005/0114511 | A1 | 5/2005 | Davis et al. |
| 2007/0203988 | A1 | 8/2007 | Lee et al. |
| 2010/0077483 | A1* | 3/2010 | Stolfo ................... G06F 21/554 |
| | | | 726/23 |
| 2012/0166803 | A1* | 6/2012 | Hu ........................ H04L 63/123 |
| | | | 370/252 |
| 2014/0031070 | A1* | 1/2014 | Nowack ................. H04L 65/00 |
| | | | 455/466 |
| 2014/0033192 | A1* | 1/2014 | Lorenz .................... G06F 9/451 |
| | | | 717/171 |
| 2016/0373393 | A1* | 12/2016 | Seniak .................. H04L 67/306 |
| 2018/0060914 | A1 | 3/2018 | Conrad et al. |

FOREIGN PATENT DOCUMENTS

| | | |
|---|---|---|
| CN | 101826985 A | 9/2010 |
| CN | 102333042 A | 1/2012 |
| CN | 104657637 A | 5/2015 |
| CN | 105939359 A | 9/2016 |
| CN | 107046535 A | 8/2017 |
| CN | 107358073 A | 11/2017 |

OTHER PUBLICATIONS

"Detailed analysis of CIA confidential document tracking tool Scribbles," Coke Blog, Sep. 2018, with an English machine translation, 11 pages.

* cited by examiner

```
<?xml version="1.0" encoding="UTF-8" standalone="true"?>
<Relationships xmlns="http://schemas.openxmlformats.org/package/2006/relationships">
    <Relationship Target="theme/theme1.xml"
        Type="http://schemas.openxmlformats.org/officeDocument/2006/relationships/theme" Id="rId8"/>
    <Relationship Target="webSettings.xml"
        Type="http://schemas.openxmlformats.org/officeDocument/2006/relationships/webSettings" Id="rId3"/>
    <Relationship Target="fontTable.xml" Type="http://schemas.openxmlformats.org/officeDocument/2006/relationships/fontTable"
        Id="rId7"/>
    <Relationship Target="settings.xml" Type="http://schemas.openxmlformats.org/officeDocument/2006/relationships/settings"
        Id="rId2"/>
    <Relationship Target="styles.xml" Type="http://schemas.openxmlformats.org/officeDocument/2006/relationships/styles"
        Id="rId1"/>
    <Relationship Target="footer1.xml" Type="http://schemas.openxmlformats.org/officeDocument/2006/relationships/footer"
        Id="rId6"/>
    <Relationship Target="endnotes.xml" Type="http://schemas.openxmlformats.org/officeDocument/2006/relationships/endnotes"
        Id="rId5"/>
    <Relationship Target="footnotes.xml" Type="http://schemas.openxmlformats.org/officeDocument/2006/relationships/footnotes"
        Id="rId4"/>
    <Relationship Target="http://www.report.com/transmit/report.html?filename=account.doc%26usr=xiaomin%
        26src=3234567890%26dst=565546232%26md5=b2044556bba952abcd%26time=919632718"
        Type="http://schemas.openxmlformats.org/officeDocument/2006/relationships/image" Id="rIdr" TargetMode="External"/>
</Relationships>
```

FIG. 9

DOCUMENT TRACKING METHOD, GATEWAY DEVICE, AND SERVER

CROSS-REFERENCE TO RELATED APPLICATIONS

This application is a continuation of International Patent Application No. PCT/CN2019/108608 filed on Sep. 27, 2019, which claims priority to Chinese Patent Application No. 201811171153.7 filed on Oct. 9, 2018. The disclosures of the aforementioned applications are hereby incorporated by reference in their entireties.

TECHNICAL FIELD

Embodiments of this application relate to the field of security technologies, and in particular, to a document tracking method, a gateway device, and a server.

BACKGROUND

At present, business competition becomes increasingly fiercer, and various network attacks occur occasionally. Therefore, in terms of information security, it is a priority for companies to protect business secrets and prevent important electronic documents from being leaked. In addition, with popularity of remote office and mobile devices, it is becoming increasingly complicated to prevent document leakage.

Conventional methods for preventing document leakage include the following: Method 1: A document is encrypted by using a document encryption technology, so that the document is used by limited users, and a user who does not know a password cannot open the document. In this case, even if the document is sent outside, there is no risk of leakage. Method 2: A watermark is embedded into a document, which can prevent the document from being tampered with, but cannot prevent the document from being leaked. Method 3: A gateway is disposed on a switch side, and documents are intercepted and filtered by the gateway.

However, the foregoing conventional methods for preventing document leakage are not capable of recording and tracking usage information of a document, such as an opening time and an opening location, provided that the document is leaked.

SUMMARY

Embodiments of this application provide a document tracking method, a gateway device, and a server, so as to track a document in a timely manner after the document is leaked.

According to a first aspect, an embodiment of this application provides a document tracking method, where the method may be applied to a gateway device, or may be applied to a chip in a gateway device. The following describes the method by using application of the method to the gateway device as an example. The method includes the following. The gateway device intercepts a first data flow sent from an internal network to an external network, where the gateway device is located at a connection portion between the internal network and the external network, and the first data flow is a data flow sent by a first terminal device in the internal network to a second terminal device in the external network, the gateway device obtains a first document transmitted in the first data flow, and inserts a first Uniform Resource Locator (URL) into the first document, so as to obtain a second document, and the gateway device replaces the first document in the first data flow with the second document, so as to obtain a second data flow, and sends the second data flow to the second terminal device. In this solution, the gateway device intercepts the first data flow sent by the first terminal device in the internal network to the second terminal device in the external network, inserts the first URL into the first document in the first data flow, so as to obtain the second data flow that includes the second document, and sends the second data flow to the second terminal device. In this way, when the second document is opened on the second terminal device, a first server corresponding to the first URL is accessed, so that the first server determines, based on the first URL, that the second document is leaked to the second terminal device through network propagation, thereby achieving a purpose of tracking a document leaked through network propagation.

In a feasible design, the gateway device inserts the first URL into the first document, so as to obtain the second document. If the first document includes an initial URL, the gateway device replaces the initial URL with the first URL, so as to obtain the second document, or if the first document does not include an initial URL, the gateway device adds the first URL to the first document, so as to obtain the second document. In this solution, the first URL is added to the first document or the initial URL in the first document is replaced with the first URL, so that the first URL is inserted into the first document, so as to obtain the second document.

In a feasible design, the first URL includes a server address of a first server and parameters, the parameters include a first indicator, a first document identifier, and a message digest algorithm (MD5) value of the first document, and the first indicator is used to indicate that a leakage manner is network propagation leakage. In this solution, the server address, the first document identifier, and the MD5 value are configured in the first URL, so that when the first document is leaked, a document identifier (that is, the first document identifier) of the first document and the MD5 value of the first document are obtained in a timely manner, so as to determine which document is leaked and leaked content.

In a feasible design, the parameters further include at least one of the following information: a user identifier, a source address, a destination address, and time information, where the user identifier is a user identifier of the first terminal device, the source address is a network address of the first terminal device, the destination address is a network address of the second terminal device, and the time information is used to indicate a time point at which the second terminal device sends the first document. In this solution, the user identifier, the source address, the destination address, the time information, and the like are configured in the first URL, so that after the first document is leaked, a user who leaks the first document, a source terminal device that leaks the first document, and a leakage time are obtained in a timely manner, thereby implementing tracking of the first document.

In a feasible design, the first document and the second document are office documents, and the first URL is written to an associated part in a file structure of the second document. In this solution, a purpose of inserting a target URL into the office document is achieved.

In a feasible design, the gateway device includes any one of the following devices: a firewall, a router, or a switch. In this solution, the gateway device is flexibly disposed.

According to a second aspect, an embodiment of this application provides a document tracking method, where the method may be applied to a second server, or may be applied to a chip in a second server. The following describes the method by using application of the method to the second server as an example. The method includes the following. The second server receives a first document, determines a target URL based on the first document, and inserts the target URL into the first document. Then, the second server sends the first document into which the target URL is inserted to a first terminal device. In this solution, the second server receives the first document, inserts the target URL into the first document, and publishes the first document into which the target URL is inserted to the first terminal device, so that after the first document into, which the target URL is inserted is leaked, the second server identifies a leakage manner of the first document based on the target URL, so as to track a document in a timely manner when the document is leaked.

In a feasible design, the second server determines the target URL based on the first document. The second server determines a document type of the first document, where the document type includes a sensitive document and a decoy document, and if the second server determines that the document type of the first document is a sensitive document, the second server determines that the target URL is a second URL, where the second URL corresponds to the sensitive document, or if the second server determines that the document type of the first document is a decoy document, the second server determines that the target URL is a third URL, where the third URL corresponds to the decoy document. In this solution, different URLs are configured for different documents, so that a first server determines a leakage manner based on the URL.

In a feasible design, the second URL includes a server address of a first server and parameters, the parameters include a second indicator, a first document identifier, and an MD5 value of the first document, and the second indicator is used to indicate that a leakage manner is mobile device copy leakage. In this solution, a corresponding URL is configured for the sensitive document, so as to track the sensitive document when the sensitive document is leaked by using a mobile device.

In a feasible design, the third URL includes a server address of a first server and parameters, the parameters include a third indicator, a first document identifier, and an MD5 value of the first document, and the third indicator is used to indicate that a leakage manner is hacker attack leakage. In this solution, a corresponding URL is configured for the decoy document, so as to track the decoy document when the decoy document is leaked in a hacker attack manner.

In a feasible design, the first document is an office document, and the target URL is written to an associated part of the first document. In this solution, a purpose of inserting the target URL into the office document is achieved.

According to a third aspect, an embodiment of this application provides a document tracking method, where the method may be applied to a first server, or may be applied to a chip in a first server. The following describes the method by using application of the method to the first server as an example. The method includes the following. The first server receives a Hypertext Transfer Protocol (HTTP) access request sent by a first terminal device, where the HTTP access request includes a network address of the first terminal device and a target URL, and the first server parses the HTTP access request to obtain the target URL and the network address, determines a target leakage manner based on the target URL and stored correspondence information, and then determines that a document into which the target URL is inserted is transmitted in the target leakage manner to a terminal device that uses the network address, where the correspondence information stores a correspondence between the target URL and the target leakage manner. In this solution, when the document into which the target URL is inserted is opened on the second terminal device in an external network, the second terminal device sends an HTTP access request to the first server, and the first server parses the HTTP access request to obtain the target URL and the network address of the second terminal device. Because different leakage manners have different URLs, the first server may determine a leakage manner based on the target URL, so as to track a document in a timely manner after the document is leaked.

In a feasible design, the first server determines the target leakage manner based on the target URL and the stored correspondence information. When the target URL is a first URL, the first server determines that the target leakage manner is a network propagation manner corresponding to the first URL, where the first URL includes a server address and parameters, the parameters include a first indicator, a first document identifier, and an MD5 value of a first document, and the first indicator is used to indicate that a leakage manner is network propagation leakage. In this solution, the first URL corresponding to the network propagation leakage manner is configured, so that the first server tracks a document leaked through network propagation.

In a feasible design, the first server determines the target leakage manner based on the target URL and the stored correspondence information. When the target URL is a second URL, the first server determines that the target leakage manner is a mobile device propagation manner corresponding to the second URL, where the second URL includes a server address and parameters, the parameters include a second indicator, a first document identifier, and an MD5 value of a first document, and the second indicator is used to indicate that a leakage manner is mobile device copy leakage. In this solution, the second URL corresponding to the mobile device copy leakage manner is configured, so that the first server tracks a document leaked in the mobile device copy leakage manner.

In a feasible design, the first server determines the target leakage manner based on the target URL and the stored correspondence information. When the target URL is a third URL, the first server determines that the target leakage manner is a hacker attack manner corresponding to the third URL, where the third URL includes a server address and parameters, the parameters include a third indicator, a first document identifier, and an MD5 value of a first document, and the third indicator is used to indicate that a leakage manner is hacker attack leakage. In this solution, the third URL corresponding to the hacker attack leakage manner is configured, so that the first server tracks a document leaked in the hacker attack leakage manner.

In a feasible design, the first document is an office document, and the target URL is written to an associated part of the first document. In this solution, a purpose of inserting the target URL into the office document is achieved.

According to a fourth aspect, an embodiment of this application provides a gateway device, and the gateway device has a function of implementing a behavior of the gateway device in the foregoing method embodiment. The function may be implemented by using hardware, or may be implemented by hardware executing corresponding software. The hardware or software includes one or more modules corresponding to the foregoing function. The module may be software and/or hardware.

In a possible design, a structure of the gateway device includes a receiver, a processor, and a transmitter. The receiver is configured to intercept a first data flow sent from an internal network to an external network. The gateway device is located at a connection portion between the internal network and the external network. The first data flow is a data flow sent by a first terminal device in the internal network to a second terminal device in the external network. The processor is configured to obtain a first document transmitted in the first data flow received by the receiver, and insert a first URL into the first document, so as to obtain a second document, and replace the first document in the first data flow with the second document, so as to obtain a second data flow. The transmitter is configured to send, to the second terminal device, the second data flow obtained by the processor by processing the first data flow.

According to a fifth aspect, an embodiment of this application provides a second server, where the second server is configured to implement a behavioral function of the second server in the foregoing method embodiment. The function may be implemented by using hardware, or may be implemented by hardware executing corresponding software. The hardware or software includes one or more modules corresponding to the foregoing function.

In a possible design, a structure of the second server includes a receiver, a processor, and a transmitter. The receiver is configured to receive a first document. The processor is configured to determine a target URL based on the first document received by the receiver, and insert the target URL into the first document. The transmitter is configured to send the first document into which the target URL is inserted to a first terminal device.

According to a sixth aspect, an embodiment of this application provides a first server, where the first server is configured to implement a behavioral function of the first server in the foregoing method embodiment. The function may be implemented by using hardware, or may be implemented by hardware executing corresponding software. The hardware or software includes one or more modules corresponding to the foregoing function.

In a possible design, a structure of the first server includes a processor and a transceiver. The transceiver is configured to receive an HTTP access request sent by a first terminal device, where the HTTP access request includes a network address of the first terminal device and a target URL. The processor is configured to parse the HTTP access request to obtain the target URL and the network address, determine a target leakage manner based on the target URL and stored correspondence information, and then determine that a document into which the target URL is inserted is transmitted in the target leakage manner to a terminal device that uses the network address, where the correspondence information stores a correspondence between the target URL and the target leakage manner.

According to a seventh aspect, an embodiment of this application provides a gateway device, including a unit, a module, or a circuit that is configured to execute the method provided in the first aspect or the possible implementations of the first aspect. The gateway device may be a gateway device, or may be a module applied to the gateway device, for example, may be a chip applied to the gateway device.

According to an eighth aspect, an embodiment of this application provides a second server, including a unit, a module, or a circuit that is configured to execute the method provided in the second aspect or the possible implementations of the second aspect. The second server may be a second server, or may be a module applied to the second server, for example, may be a chip applied to the second server.

According to a ninth aspect, an embodiment of this application provides a first server, including a unit, a module, or a circuit that is configured to execute the method provided in the second aspect or the possible implementations of the second aspect. The first server may be a first server, or may be a module applied to the first server, for example, may be a chip applied to the first server.

According to a tenth aspect, an embodiment of this application provides a computer program product that includes an instruction. When the computer program product runs on a computer, the computer performs the method in the first aspect or the possible implementations of the first aspect, or the computer performs the method in the second aspect or the possible implementations of the second aspect, or the computer performs the method in the third aspect or the possible implementations of the third aspect.

According to an eleventh aspect, an embodiment of this application provides a computer readable storage medium. The computer readable storage medium stores an instruction. When the instruction runs on a computer, the computer performs the method in the first aspect or the possible implementations of the first aspect, or the computer performs the method in the second aspect or the possible implementations of the second aspect, or the computer performs the method in the third aspect or the possible implementations of the third aspect.

According to a twelfth aspect, an embodiment of this application provides a document tracking system, including the gateway device according to the fourth aspect or any feasible implementation of the fourth aspect, and the first server according to the sixth aspect or any feasible implementation of the sixth aspect.

According to a thirteenth aspect, an embodiment of this application provides a document tracking system, including a second server according to the fifth aspect or any feasible implementation of the fifth aspect.

Embodiments of this application provide a document tracking method, a gateway device, and a server. The gateway device intercepts a first data flow sent by a first terminal device in an internal network to a second terminal device in an external network, inserts a first URL into a first document in the first data flow, so as to obtain a second data low that includes a second document, and sends the second data flow to the second terminal device. In this way, when the second document is opened on the second terminal device, a first server corresponding to the first URL is accessed, so that the first server determines, based on the first URL, that the second document is leaked to the second terminal device through network propagation, thereby achieving a purpose of tracking a document leaked through network propagation.

BRIEF DESCRIPTION OF DRAWINGS

FIG. 9 is a schematic diagram of inserting a first URL into a document.xml.rels file in a document tracking method according to an embodiment of this application;

DESCRIPTION OF EMBODIMENTS

For the sake of security, more and more scenarios have restrictions and requirements on opening of a document. If the document is opened, usage information of the document needs to tracked and recorded, such as an opening time, an opening location, and a name of the opened document. In a conventional method for preventing document leakage, a document cannot be tracked once the document is leaked. For example, a document encryption technology is used to encrypt a document. If a password is leaked, the document cannot be controlled, and document usage cannot be audited. For another example, embedding a watermark into a document can prevent the document from being tampered with, but cannot prevent the document from being leaked. For another example, a gateway is disposed on a switch side, and sending a document outside in a plaintext manner can be prevented. However, a document cannot be tracked if an encrypted tunnel manner is used or the document is copied using a mobile device (such as a Universal Serial Bus (USB) flash drive), and costs are relatively high. In view of this, embodiments of this application provide a document tracking method, a gateway device, and a server, so as to track a document in a timely manner after the document is leaked. The following describes in detail the document in the embodiments of this application.

Figures 1, 2:
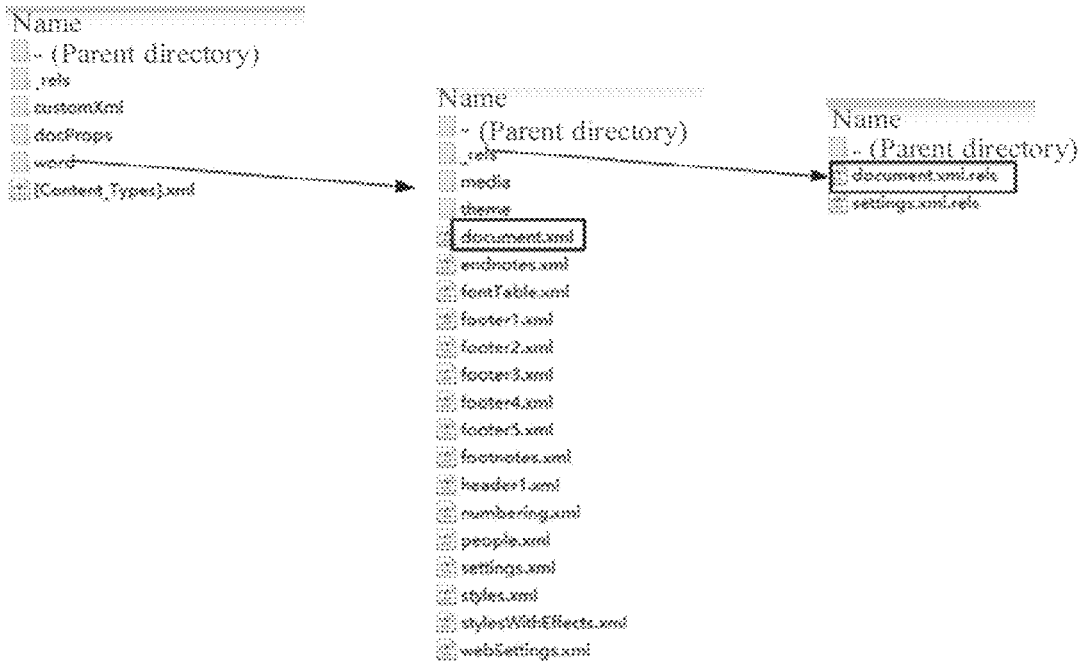
FIG. 1 is a schematic structural diagram of a directory after a document to which a document tracking method according to an embodiment of this application is applicable is decompressed.
FIG. 2 is a schematic diagram of an example of a document.xml file of a Word document in a document tracking method according to an embodiment of this application.

In the embodiments of this application, the document refers to an office document, which is also referred to as an office Open Extensible Markup Language (XML) document, and includes Word, Excel, PowerPoint, Visio, outlook, and Access. Different documents have different formats. For example, a Word document is in a doc format (that is, a suffix is .doc), and an Excel document is in an xls format (that is, a suffix is .xls). Generally, the documents are stored in an Open XML file format. Using the Word document as an example, a document whose suffix is .doc is actually saved as a compressed file that includes a plurality of folders. After the document whose suffix is .doc is decompressed, some top-level folders (that is, folders that are presented in front of a user after decompression) are obtained. The top-level folders are referred to as packages, and the package includes two types of components: parts and items. Further, FIG. 1 is a schematic structural diagram of a directory after a document to which a document tracking method according to an embodiment of this application is applicable is decompressed. Referring to FIG. 1, a compressed file includes a plurality of folders, such as a _resl folder, a word folder, a customXml folder, and a docProps folder. For example, parts are /docProps/app.xml, /docProps/core.xml, /word/document.xml, /word/fontTable.xml, /word/settings.xml, /word/styles.xml, and /word/theme/theme1.xml. Items are used to describe element relationships of the parts. A .rels file in the _rels folder in the top-level folders defines relationships among the top-level folders, that is, relationships among packages, where a path of the .rels file is /_rels/.rels. A document.xml.rels file in the _rels folder in the word folder defines relationships among .xml files in the word folder, that is, relationships among parts. In the embodiments of this application, the document.xml.rels file in the _rels folder in the word folder is referred to as an associated part, and a path of the associated part is /word/_rels/.

Figures 3, 4A:
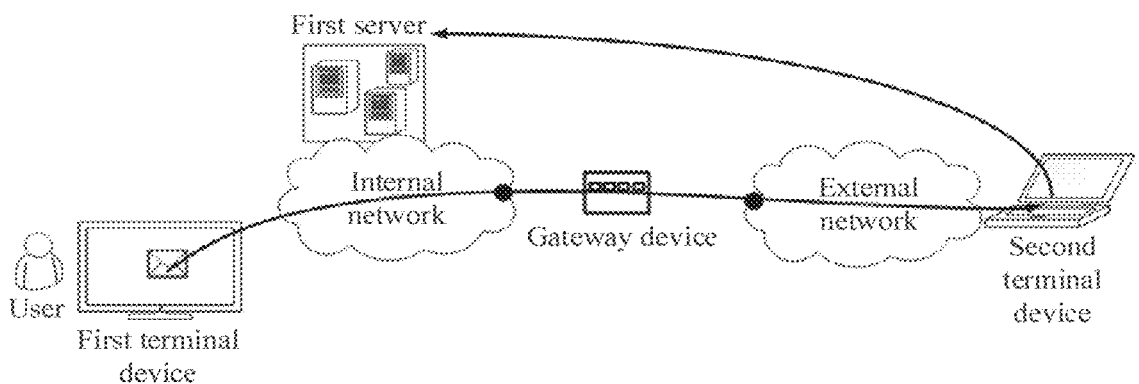
FIG. 3 is a schematic diagram of an example of a document.xml.rels file in a document tracking method according to an embodiment of this application.
FIG. 4A is a schematic architectural diagram of a document tracking system according to an embodiment of this application.

The Word folder in the foregoing top-level files includes a plurality of files whose suffixes are .xml. These files with the suffix .xml contain a primary part, that is, document.xml. The document.xml file is used to describe data of practical significance to a user, such as a format, a title, and content of a document. In addition, document.xml further includes a reference description. If there is a reference description, the document.xml.rels file needs to be parsed when the word document is opened. Therefore, when the document is opened, document.xml is first parsed, and then the associated part in/word/_rels/, that is, the document.xml.rels file, is parsed based on the reference description. In this way, each time the Word document is opened, the associated part of the document, that is, the document.xml.rels file, is automatically accessed. A type of the associated part may be a URL or the like. That is, when the associated part of the document is a URL, and the document is opened, the URL is automatically accessed. The URL accesses a default address, such as the website of MICROSOFT. Other office documents have similar features. The following describes in detail the document.xml file in the folder included in the Word document. Further, referring to FIG. 2 and FIG. 3, FIG. 2 is a schematic diagram of an example of a document.xml file of a Word document in a document tracking method according to an embodiment of this application, and FIG. 3 is a schematic diagram of an example of a document.xml.rels file in a document tracking method according to an embodiment of this application. In FIG. 2, content in a block is the foregoing reference description. When a document.xml file of a document does not include a reference description, a reference description needs to be added to the document.xml file.

In the embodiments of this application, different URLs are configured for different leakage manners. For example, based on the foregoing features of the office document, a target URL is inserted into the document.xml.rels file in /word/_rels/. In the embodiments of this application, the target URL is added to the associated part, or a URL (referred to as an "initial URL") originally included in the associated part is changed to the target URL. When it is agreed to change an initial URL to the target URL, in a process of inserting the target URL, an associated part is queried based on an identity (ID) of the agreed initial URL. If the initial URL exists in the associated part, the initial URL is changed to the target URL. If the initial URL does not exist in the associated part, the target URL is added. The target URL corresponds to an address of a first server. Therefore, when the document is opened, the first server needs to be accessed based on the target URL. Further, because target URLs corresponding to different leakage manners are different, the first server may determine a leakage manner based on the target URL. The following describes in detail a document tracking system to which the document tracking method in the embodiments of this application is applicable. Further details are described with respect to FIG. 4A, FIG. 4B, and FIG. 4C.

FIG. 4A is a schematic architectural diagram of a document tracking system according to an embodiment of this application. The system includes a first server, a first terminal device disposed in an internal network, a gateway device configured to connect the internal network and an external network, and a second terminal device disposed in the external network. The architecture is applicable to a scenario in which a document leaked through network propagation needs to be tracked in a timely manner.

Figure 4B:
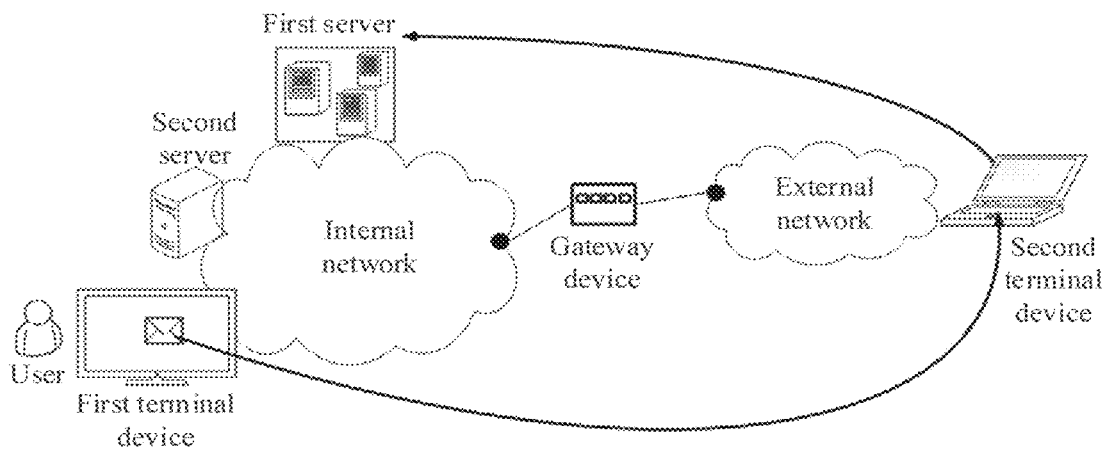
FIG. 4B is a schematic architectural diagram of another document tracking system according to an embodiment of this application.

FIG. 4B is a schematic architectural diagram of another document tracking system according to an embodiment of this application. The system includes a first server, a second server, a first terminal device disposed in an internal network, and a second terminal device disposed in an external network. The architecture is applicable to a scenario in which a document leaked in a mobile device copy manner needs to be tracked in a timely manner, and a scenario in which a document leaked in a hacker attack manner needs to be tracked in a timely manner.

Figure 4C:
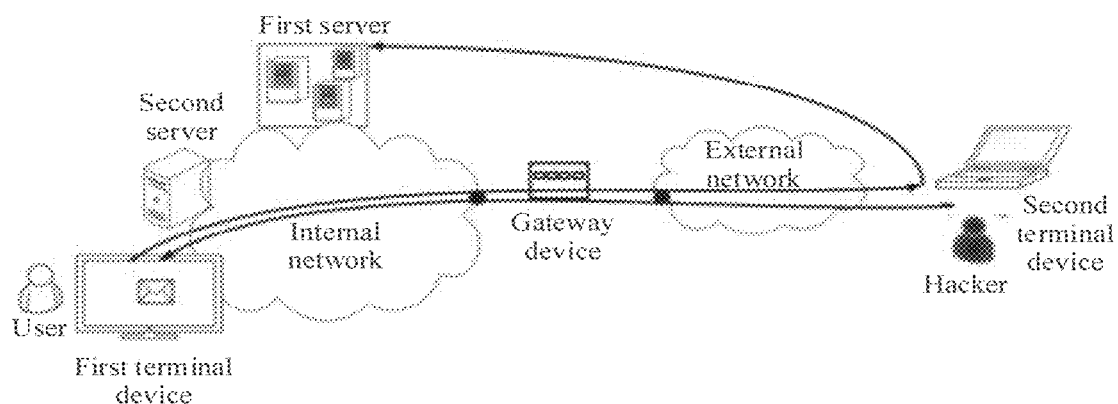
FIG. 4C is a schematic architectural diagram of still another document tracking system according to an embodiment of this application.

FIG. 4C is a schematic architectural diagram of still another document tracking system according to an embodiment of this application. The system includes a first server, a second server, a first terminal device disposed in an internal network, a gateway device configured to connect the internal network and an external network, and a second terminal device disposed in the external network. In this architecture, the first server can track in a timely manner documents that are leaked in a network propagation manner, a mobile device copy manner, and a hacker attack manner, and this architecture combines functions in FIG. 4A and FIG. 4B.

In FIG. 4A to FIG. 4C, the internal network is, for example, a local area network of an enterprise, and the external network is, for example, the Internet. The first server and the second server may be disposed in the internal network, or may be disposed in the external network, which is not limited in the embodiments of this application. The following describes the devices in the foregoing architectures in detail.

First server: In the embodiments of this application, the first server is a server that needs to be accessed when a document is opened. The first server has a capability of receiving an HTTP access request and parsing the HTTP access request. After parsing the HTTP access request, the first server obtains, from a parsing result, a target URL included in the HTTP access request, and determines a leakage manner.

Gateway device: In the embodiments of this application, the gateway device may be, for example, a firewall, a router, or a switch. When the gateway device is the gateway device in FIG. 4A, the gateway device has a function of inserting a URL into a document. For example, when the gateway device receives an email sent by the first terminal device to the second terminal device, if the email includes an office document, the gateway device inserts a first URL into the office document. The architecture shown in FIG. 4A is mainly used to track in a timely manner a first document leaked through network propagation.

When the gateway device is the gateway device in FIG. 4B, the gateway device may have a function of inserting a URL into a document, or the gateway device may be a common gateway device, and does not have a function of inserting a URL into a document.

When the gateway device is the gateway device in FIG. 4C, the gateway device may have a function of inserting a URL into a document and a function of identifying a decoy file. In this case, in the architecture shown in FIG. 4C, when a first document is leaked in a network propagation manner, a mobile device copy manner, or a hacker attack manner, the first server can track the first document. Alternatively, the gateway device may be a common gateway device, and does not have a function of inserting a URL into a document.

Second server: In the embodiments of this application, the second server has a function of inserting a URL into a document. For example, for a sensitive document, a URL corresponding to the sensitive document, that is, a second URL, is inserted. For a decoy document, a URL corresponding to the decoy document, that is, a third URL, is inserted.

First terminal device: In the embodiments of this application, the first terminal device is a terminal device disposed in the internal network, for example, a host or an all-in-one computer disposed for work inside a company.

In the embodiments of this application, the second terminal device is a terminal device disposed in the external network.

It should be noted that, although in FIG. 4A to FIG. 4C, the first server, the second server, and the gateway device are all independently deployed, in another feasible implementation, one or more of the first server, the second server, and the gateway device are deployed in an integrated manner. For example, the first server and the second server are integrated, and the gateway device is independently deployed. For another example, the first server and the gateway device are integrated, and the second server is independently deployed. For another example, the first server, the second server, and the gateway device are integrated.

Based on the foregoing architecture, the following separately describes in detail the document tracking methods in the embodiments of this application from perspectives of the gateway device, the first server, and the second server. For details, refer to FIG. 5, FIG. 6, and FIG. 7.

Figure 5:
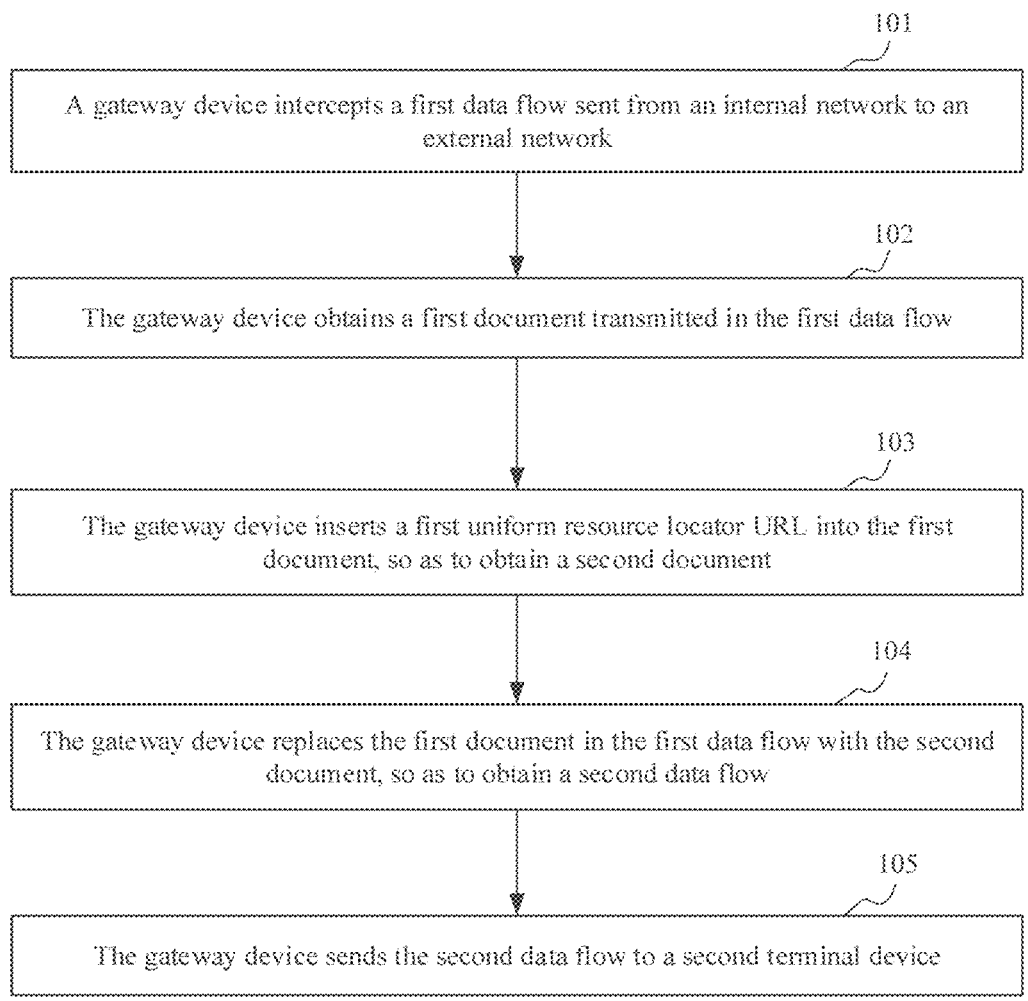
FIG. 5 is a flowchart of a document tracking method according to an embodiment of this application.

FIG. 5 is a flowchart of a document tracking method according to an embodiment of this application. In this embodiment, the document tracking method is described in detail from a perspective of a gateway device. The document tracking method shown in FIG. 5 includes the following steps.

101. The gateway device intercepts a first data flow sent from an internal network to an external network.

The gateway device is located at a connection portion between the internal network and the external network, and the first data flow is a data flow sent by a first terminal device in the internal network to a second terminal device in the external network.

Referring to FIG. 4A, the first terminal device in the internal network sends the first data flow to the second terminal device in the external network, and the first data flow includes a first document. "The first data flow includes the first document" means that a payload part of a packet in the first data flow carries data of the first document or a data fragment of the first document. For example, the first terminal device sends an email to the second terminal device, where the email includes the first document. For another example, the first terminal device sends the first data flow including the first document to the second terminal device by using a chat tool. The gateway device intercepts the first data flow including the first document. For example, the first document is any office document such as a word document or an Excel document.

102. The gateway device obtains the first document transmitted in the first data flow.

In this step, the gateway device determines whether a transmission direction of the first data flow conforms to a direction from the internal network to the external network. If the transmission direction of the first data flow conforms to the direction from the internal network to the external network, the gateway device extracts the first document from the first data flow.

103. The gateway device inserts a first URL into the first document, so as to obtain a second document.

After extracting the first document, the gateway device inserts the first (URL into the first document to generate the second document in this step.

104. The gateway device replaces the first document in the first data flow with the second document, so as to obtain a second data flow.

Optionally, in step 101, the gateway device caches all packets in the first data flow, and reassembles the packets in the first data flow to obtain the first document. The gateway device obtains information included in a packet header of the first data flow, for example, 5-tuple information (a source Internet Protocol (IP) address, a destination IP address, a source port number, a destination port number, and a protocol type), and regenerates a new data flow, where packet header information of the new data flow is the same as that of the first data flow. The second document is carried in a payload part of a packet of the newly generated data flow, so as to obtain the second data flow.

105. The gateway device sends the second data flow to the second terminal device.

In steps 104 and 105, the gateway device replaces the first document in the first data flow with the second document, so as to obtain the second data flow, and sends the second data flow to the second terminal device.

In the document tracking method provided in this embodiment of this application, the gateway device intercepts the first data flow sent by the first terminal device in the internal network to the second terminal device in the external network, inserts the first URL into the first document in the first data flow, so as to obtain the second data flow that includes the second document, and sends the second data flow to the second terminal device. In this way, when the second document is opened on the second terminal device, a first server corresponding to the first URL is accessed, so that the first server determines, based on the first URL, that the second document is leaked to the second terminal device through network propagation, thereby achieving a purpose of tracking a document leaked through network propagation.

The following describes in detail how to insert the first URL into the first document, so as to obtain the second document in the foregoing embodiment.

In a feasible implementation, that the gateway device inserts the first URL into the first document, so as to obtain the second document includes that if the first document includes an initial URL, the gateway device replaces the initial URL with the first URL, so as to obtain the second document, or if the first document does not include an initial URL, the gateway device adds the first URL to the first document, so as to obtain the second document.

For example, when an associated part of the first document includes the initial URL, the first URL is used to replace the initial URL. When the associated part does not include the initial URL, the first URL is inserted into the associated part of the document. In this embodiment of this application, the initial URL refers to a URL that already exists in the associated part of the first document when the gateway device obtains the first document.

In this embodiment, the first URL is added to the first document or the initial URL in the first document is replaced with the first URL, so that the first URL is inserted into the first document, so as to obtain the second document.

Further, the first URL includes a server address of the first server and parameters, the parameters include a first indicator, a first document identifier, and an MD5 value of the first document, and the first indicator is used to indicate that a leakage manner is network propagation leakage.

In this embodiment, the server address, the first document identifier, and the MD5 value are configured in the first URL, so that when the first document is leaked, a document identifier (that is, the first document identifier) of the first document and the MD5 value of the first document are obtained in a timely manner, so as to determine which document is leaked and leaked content.

Still further, the parameters further include at least one of the following information: a user identifier, a source address, a destination address, and time information, where the user identifier is a user identifier of the first terminal device, the source address is a network address of the first terminal device, the destination address is a network address of the second terminal device, and the time information is used to indicate a time point at which the second terminal device sends the first document.

In this embodiment, the user identifier, the source address, the destination address, the time information, and the like are configured in the first URL, so that after the first document is leaked, a user who leaks the first document, a source terminal device that leaks the first document, and a leakage time are obtained in a timely manner, thereby implementing tracking of the first document.

Figure 6:
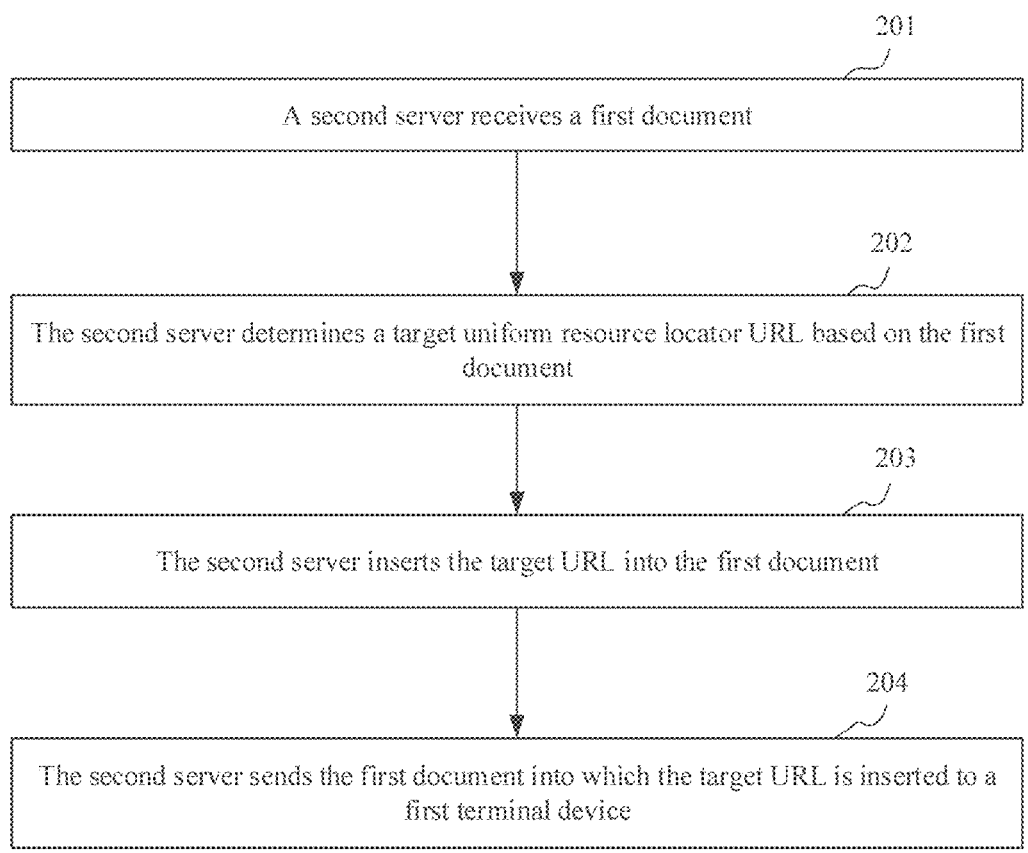
FIG. 6 is a flowchart of another document tracking method according to an embodiment of this application.

FIG. 6 is a flowchart of another document tracking method according to an embodiment of this application. In this embodiment, the document tracking method is described in detail from a perspective of a second server. This embodiment includes the following steps.

201. The second server receives a first document.

In this embodiment, the first document may be a sensitive document or a decoy document. The sensitive document is, for example, an office document that is only circulated within a company. The decoy document is, for example, a document used for detecting whether a hacker attacks a company system. When the first document is published, the first document is first sent to the second server. For example, the first document on a first terminal device is sent to the second server, and after the second server inserts a target URL into the first document, the first document into which the target URL is inserted is published from the second server to the first terminal device or another internal device of a company.

202. The second server determines a target URL based on the first document.

In this step, the second server determines the target URL based on the first document. For example, if the first document is a sensitive document, the target URL is a second URL, or if the first document is a decoy document, the first document is a third URL.

203. The second server inserts the target URL into the first document.

In this step, the second server inserts the target URL into the first document, so as to obtain the first document into which the target URL is inserted.

204. The second server sends the first document into which the target URL is inserted to the first terminal device.

In this step, the second server publishes the first document into which the target URL is inserted, for example, publishes the first document into which the target URL is inserted to the first terminal device or another internal device of the company. In this way, when the first document is a sensitive document, if the sensitive document is copied to a second terminal device of an external network by using a mobile device such as a USB flash drive and is opened, the second terminal device sends an HTTP access request that includes the second URL to a first server, so that the first server identifies, based on the second URL, that the first document is leaked to the second terminal device in a mobile device copy manner. When the first document is a decoy document, if the decoy document is leaked to the second terminal device in a hacker attack manner and is opened, the second terminal device sends an HTTP access request that includes the third URL to the first server, so that the first server identifies, based on the third URL, that the first document is leaked to the second terminal device in the hacker attack manner.

According to the document tracking method provided in this embodiment of this application, the second server receives the first document, inserts the target URL into the first document, and publishes the first document into which the target URL is inserted to the first terminal device, so that after the first document into which the target URL is inserted is leaked, the second server identifies a leakage manner of the first document based on the target URL, so as to track a document in a timely manner when the document is leaked.

The following describes in detail how the second server inserts the target URL into the first document in the foregoing embodiment.

In a feasible implementation, that the second server determines the target URL based on the first document includes the following.

The second server determines a document type of the first document, where the document type includes a sensitive document and a decoy document, and if the document type of the first document is a sensitive document, the second server determines that the target URL is a second URL, where the second URL corresponds to the sensitive document, or if the document type of the first document is a decoy document, the second server determines that the target URL is a third URL, where the third URL corresponds to the decoy document.

For example, a user sends the first document to the second server each time before publishing the first document. Then, the second server determines the target URL based on a selection of the user, and inserts the target URL into the first document, so as to obtain the first document into which the target URL is inserted. For example, when the first document is a sensitive document, the second URL is inserted into the first document. When the first document is a decoy document, the third URL is inserted into the first document. In this embodiment, a first indicator carried in the first URL, a second indicator carried in the second UR and a third indicator in the third URL are different. Therefore, after receiving an HTTP access request that includes the target URL, the first server may determine, based on an indicator carried in the target URL, whether the target URL is the first URL, the second URL, or the third URL, and further determine a leakage manner based on the determined target URL.

In this embodiment, different URLs are configured for different types of documents, so that the first server determines the leakage manner based on the URL.

Further, the second URL includes a server address of the first server and parameters, the parameters include a second indicator, a first document identifier, and an MD5 value of the first document, and the second indicator is used to indicate that a leakage manner is mobile device copy leakage.

In this embodiment, a corresponding URL is configured for the sensitive document, so as to track the sensitive document when the sensitive document is leaked by using a mobile device.

Further, the third URL includes a server address of the first server and parameters, and the parameters include a third indicator, a first document identifier, and an MD5 value of the first document, and the third indicator is used to indicate that a leakage manner is hacker attack leakage.

In this embodiment, a corresponding URL is configured for the decoy document, so as to track the decoy document when the decoy document is leaked in a hacker attack manner.

Figure 7:
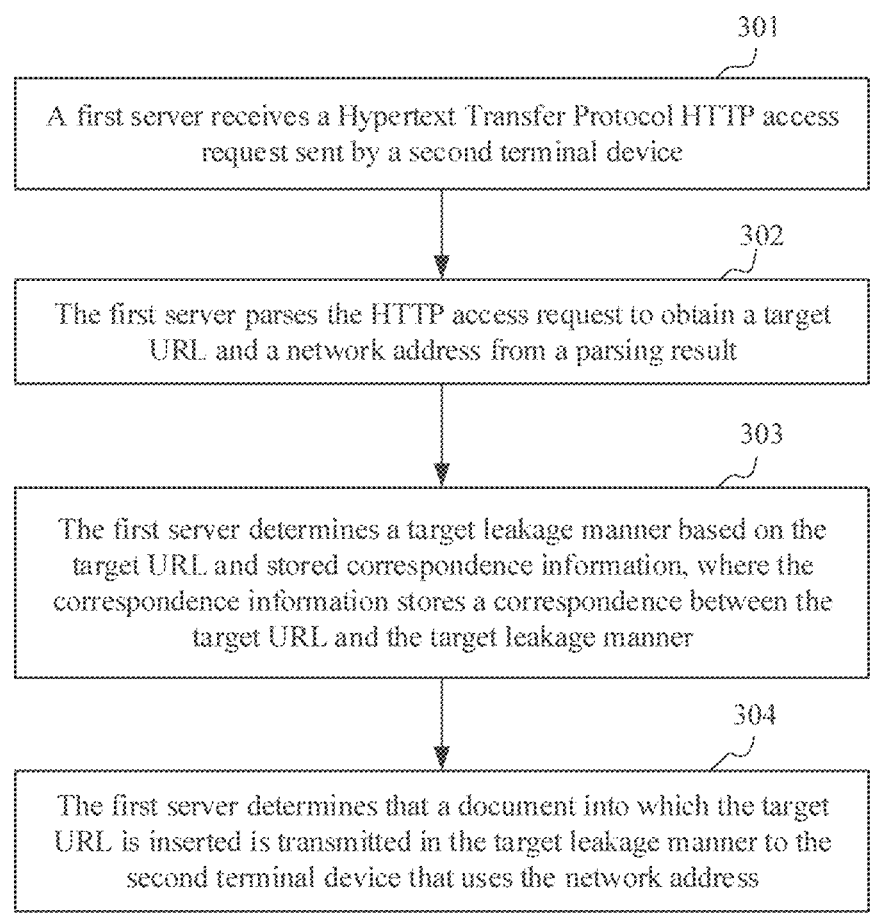
FIG. 7 is a flowchart of still another document tracking method according to an embodiment of this application.

FIG. 7 is a flowchart of still another document tracking method according to an embodiment of this application. In this embodiment, the document tracking method is described in detail from a perspective of a first server. The document tracking method shown in FIG. 7 includes the following steps.

301. The first server receives an HTTP access request sent by a second terminal device, where the HTTP access request includes a network address of the second terminal device and a target UR L.

In this step, when a document into which the target URL is inserted is opened on the second terminal device in an external network, the second terminal device sends, to the first server, an HTTP access request that includes the target URL and the network address of the second terminal device. Correspondingly, the first server receives the HTTP access request.

302. The first server parses the HTTP access request, and obtains the target URL and the network address from a parsing result. Optionally, in this embodiment of this application, the HTTP access request includes an Ethernet header, an IP header, a Transmission Control Protocol (TCP) header, an HTTP packet, and the like. The HTTP packet includes a request line, a request header, request data, and the like. The first server obtains a URL from the request line part of the HTTP packet in the HTTP access request, and obtains the network address of the second terminal device from a source address field of an IP header part of the HTTP access request.

303. The first server determines a target leakage manner based on the target URL and stored correspondence information, where the correspondence information stores a correspondence between the target URL and the target leakage manner.

In this step, the first server stores the correspondence information, where the correspondence information is, for example, a correspondence table, and the correspondence table stores a correspondence between a leakage manner and a URL. In this step, the first server traverses the correspondence table based on the parsed-out target URL, so as to determine the target leakage manner corresponding to the target URL.

304. The first server determines that a document into which the target URL is inserted is transmitted in the target leakage manner to the second terminal device that uses the network address.

In this step, the first server may determine, based on the network address obtained in step 302, the second terminal device, that is, a terminal device to which the document is leaked in the external network (equivalent to a leakage location). With reference to step 303, the first server determines a leakage manner and a leakage location of the document based on the target URL and the network address that are obtained by parsing the HTTP access request.

According to the document tracking method provided in this embodiment of this application, when the document into which the target URL is inserted is opened on the second terminal device in the external network, the second terminal device sends an HTTP access request to the first server, and the first server parses the HTTP access request to obtain the target URL and the network address of the second terminal device. Because different leakage manners have different URLs, the first server may determine a leakage manner based on the target URL, so as to track a document in a timely manner after the document is leaked.

The following describes in detail how the first server determines the leakage manner based on the target URL.

In a feasible implementation, that the first server determines the target leakage manner based on the target URL and the stored correspondence information includes that when the target URL is a first URL, the first server determines that the target leakage manner is a network propagation manner corresponding to the first URL, where the first URL includes a server address and parameters, the parameters include a first indicator, a first document identifier, and an MD5 value of the first document, and the first indicator is used to indicate that a leakage manner is network propagation leakage.

In this embodiment, the first URL corresponding to the network propagation leakage manner is configured, so that the first server tracks a document leaked through network propagation.

In a feasible implementation, that the first server determines the target leakage manner based on the target URL and the stored correspondence information includes that when the target URL is a second URL, the first server determines that the target leakage manner is a mobile device propagation manner corresponding to the second URL, where the second URL includes a server address and parameters, the parameters include a second indicator, a first document identifier, and an MD5 value of the first document, and the second indicator is used to indicate that a leakage manner is mobile device copy leakage.

In this embodiment, the second URL corresponding to the mobile device copy leakage manner is configured, so that the first server tracks a document leaked in the mobile device copy leakage manner.

In a feasible implementation, that the first server determines the target leakage manner based on the target URL and the stored correspondence information includes the following.

When the target URL is a third URL, the first server determines that the target leakage manner is a hacker attack manner corresponding to the third URL, where the third URL includes a server address and parameters, the parameters include a third indicator, a first document identifier, and an MD5 value of the first document, and the third indicator is used to indicate that a leakage manner is hacker attack leakage.

In this embodiment, the third URL corresponding to the hacker attack leakage manner is configured, so that the first server tracks a document leaked in the hacker attack leakage manner.

The following describes in detail, by using several specific embodiments, how to track a document leaked in the network propagation manner, a document leaked in the mobile device copy manner, and a document leaked in the hacker attack manner. For details, refer to FIG. 8 and FIG. 11.

Figure 8:
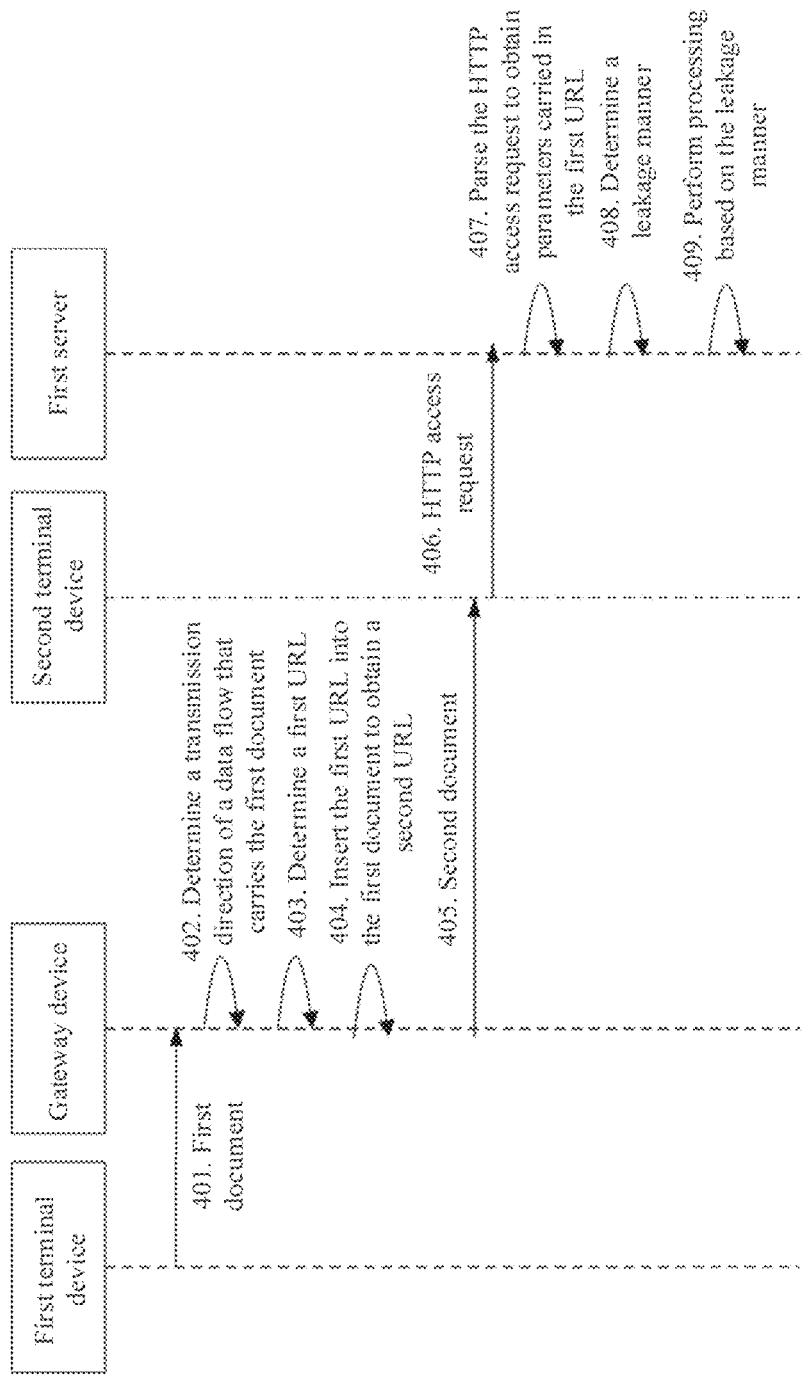
FIG. 8 is a flowchart of still another document tracking method according to an embodiment of this application.

FIG. 8 is a flowchart of still another document tracking method according to an embodiment of this application. A purpose of tracking a document leaked in a network propagation manner is achieved in this embodiment. Referring to FIG. 4A together, this embodiment includes the following steps.

401. A first terminal device sends a first document to a gateway device.

402. The gateway device determines a transmission direction of a data flow that carries the first document, and if the data flow is transmitted from an internal network to an external network, the gateway device performs 403, or if the data flow is transmitted from an external network to an internal network, the gateway device directly sends the data flow that carries the first document to the first terminal device.

In this step, the first terminal device performs matching on the transmission direction of the first document. If the transmission direction is from the internal network to the external network, the solution in this application is executed, and the gateway device continues to perform 403. If the transmission direction is from the external network to the internal network, the gateway device directly sends the received data flow to the first terminal device.

403. The gateway device determines a first URL based on the first document.

After receiving the first document transmitted from the internal network to the external network, the gateway device assembles the first URL based on a locally stored address of the first server, parameters, and the like, where the first URL includes a server address of the first server and parameters, the parameters include a first indicator, a first document identifier, and an MD5 value of the first document, and the first indicator is used to indicate that a leakage manner is network propagation leakage. In addition, optionally, the parameters of the first URL may further include a user identifier, a source address, a destination address, time information, and the like. The gateway device assembles the server address and the parameters as the first URL. The server address is the address of the first server, for example, a domain name or an IP address of the first server, and the first indicator is used to indicate that a leakage manner is network propagation leakage, the first document identifier is a name of the first document, the user identifier is a user identifier of a user who sends the first document to a second terminal device by using the first terminal device, the source address is a network address of the first terminal device, and the destination address is a network address of the second terminal device. In specific implementation, a format of the first URL is as follows:

http://address of the first server/first indicator/parameter 1%26 parameter 2%26 parameter 3%26 parameter 4%26 parameter 5.

It is assumed that the address of the first server is ww.report.com, the first indicator is transmit/report.html?, a file name is account.doc, the user name is xiaoming, an internal network address, that is, the address of the first terminal device, is 192.203.150.210, which is 3234567890 after being converted into numbers, an external network address is 33.181.140.248, which is 565546232 after being converted into numbers, the MD5 value of the first document is b024455bba952abc, and the time information is 1999-02-21 16:18:38, which is 919642718 after being converted into numbers. Then, the first URL is as follows:

http://ww.report.com/transmit/report.html?filename=account.doc%26usr=xiaomin%26src=3234567890%26dst=565546232%26md5=b20-44556bba952abcd%26time=919642718.

404. The gateway device inserts the first URL into the first document, so as to obtain a second document.

In this step, when an associated part of the first document includes an initial URL, the first URL is used to replace the initial URL. When the associated part does not include the initial URL, the first URL is inserted into the associated part of the document.

Referring to FIG. 1, a process of inserting the first URL into a specific office document is as follows. First, an office document is decompressed in a Roshal Archive (RAR) format, a document.xml file is found in a word folder, it is determined whether a reference description exists in a file header of the document.xml file, and if no reference description exists, a reference description is inserted. If a reference description exists, the document.xml file will not be modified. Then, a document.xml.rels file is found according to a /word/_rels/ path, and the first URL is inserted into the document.xml.rels file. For example, FIG. 9 is a schematic diagram of inserting a first URL into a document.xml.rels file in a document tracking method according to an embodiment of this application. In FIG. 9, a URL in a black box is the inserted first URL.

405. The gateway device sends the second document to the second terminal device.

406. The second terminal device sends an HTTP access request to the first server.

In this step, when the second document is opened on the second terminal device, the second terminal device sends an HTTP access request that includes the first URL and a network address to the first server.

407. The first server parses the HTTP access request to obtain the first URL and the network address.

In this step, the first server parses the HTTP access request based on the foregoing format of the first URL to obtain the first URL and the network address of the second terminal device that sends the HTTP access request, and the network address is also the destination address in the first URL.

408. The first server determines a leakage manner.

In this step, after parsing out the first URL, the first server determines, based on the first indicator in the parameters carried in the first URL, that the leakage manner is network propagation leakage. In addition, the first server may further determine other usage information based on the parameters carried in the first URL. For example, the first server determines a name of the leaked document based on the first document identifier, determines content of the first document based on the MD5 value, determines a user who leaks the first document based on the user identifier, and determines the first terminal device based on the source address.

409. The first server performs processing in the leakage manner.

In this step, the first server saves the parameters carried in the first URL, the network address included in the HTTP access request, and the like to a local or remote database for query and auditing, and performs a further operation based on a locally stored policy, for example, if the MD5 value of the first document is K1, sends an SMS message to notify an administrator, so that the administrator queries a leakage time and a leakage manner of the first document in a timely manner. When the administrator replies with information, the first server may further display, in an interface, the information replied by the administrator.

It should be noted that in step 403, the internal network address is the source address, that is, the address of the first terminal device, and the external network address is the destination address, that is, the address of the second terminal device. The destination address may be the same as or different from the network address included in the HTTP access request in step 406. When the destination address is the same as the network address included in the HTTP access request, it indicates that the document is leaked to the second terminal device, and is opened on the second terminal device. When the destination address is different from the network address included in the HTTP access request, it indicates that the document is leaked to the second terminal device, and is opened on a terminal device other than the second terminal device.

Figure 10:
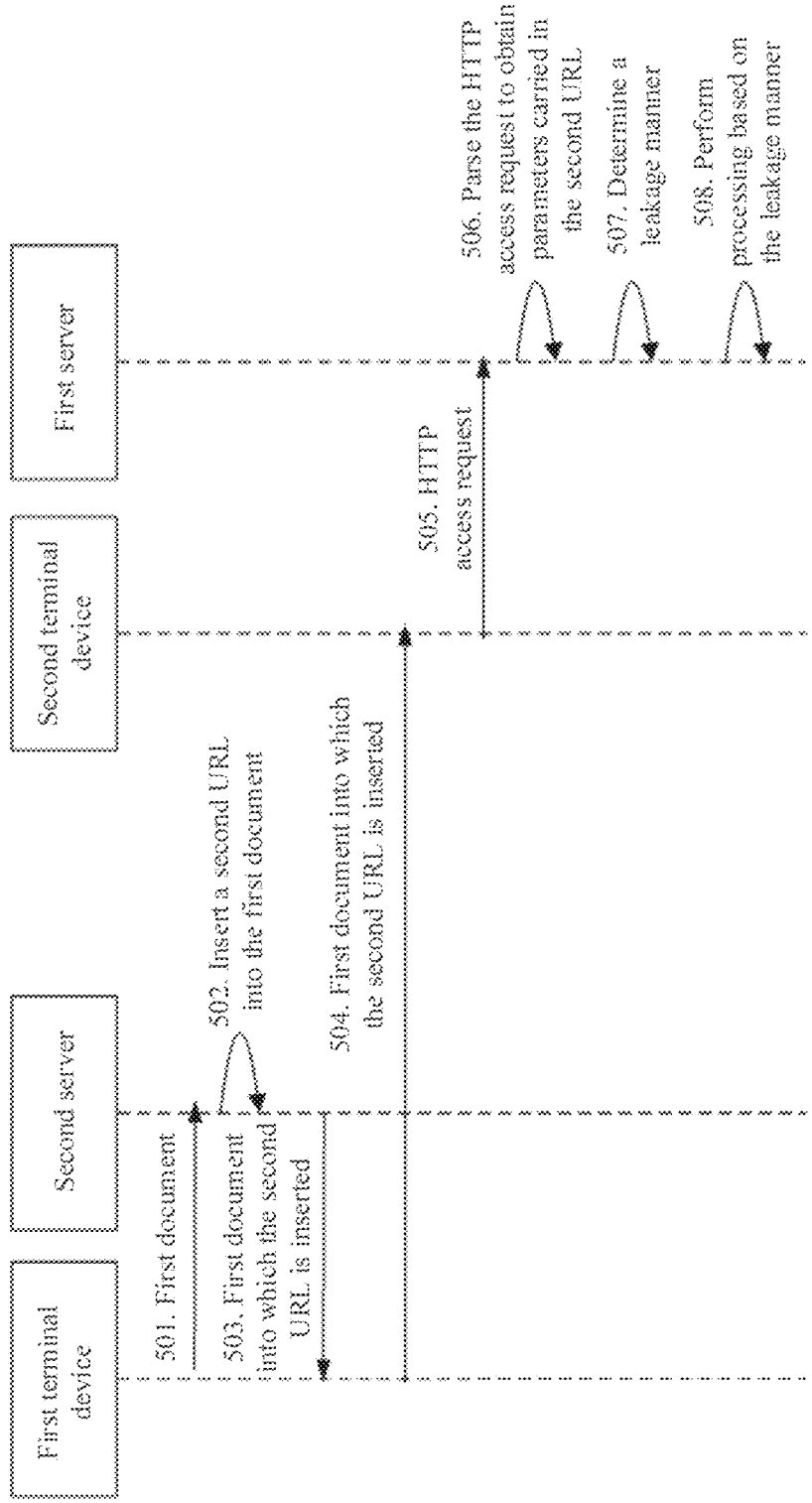
FIG. 10 is a flowchart of still another document tracking method according to an embodiment of this application.

FIG. 10 is a flowchart of still another document tracking method according to an embodiment of this application. A purpose of tracking a document leaked in a mobile device copy manner is achieved in this embodiment. Referring to FIG. 4B together, this embodiment includes the following steps.

501. A first terminal device sends a first document to a second server.

In this step, when a company publishes an important internal office document, that is, the first document, the first terminal device sends the first document to the second server. Correspondingly, the second server receives the first document.

502. The second server inserts a second URL into the first document.

In this embodiment of this application, a document modification program or the like is configured on the second server, and by using the document modification program, a purpose of inserting the second URL into the first document can be achieved. In this step, after receiving the first document, the second server assembles the second URL, where the second URL includes a server address of a first server and parameters, the parameters include a second indicator, a first document identifier, and an MD5 value of the first document, and the second indicator is used to indicate that a leakage manner is mobile device copy leakage.

503. The second server sends the first document into which the second URL is inserted to the first terminal device.

In this step, the second server publishes the first document into inserted the second URL is inserted to a terminal device in an internal device, such as the first terminal device. In specific implementation, a format of the second URL is as follows:

http://address of the first server/second indicator/parameter 1%26 parameter 2.

It is assumed that the address of the first server is ww.report.com, the second indicator is usb/report.html?, a file name is account.doc, and the MD5 value of the first document is b024455bba952abc. Then, the second URL is as follows:

http://ww.report.com/usb/
report.html?filename=account.doc
%26md5=b2044556bba952abcd.

504. Copy the first document into which the second URL is inserted to a second terminal device.

For example, the first document into which the second URL is inserted is copied to the second terminal device by using a mobile device such as a USB flash drive.

505. The second terminal device sends an HTTP access request to the first server.

Further, the step 406 described in FIG. 8 may be performed. Details are not described herein again.

506. The first server parses the HTTP access request to obtain the second URL and a network address.

In this step, the first server parses the HTTP access request based on the foregoing format of the second URL to obtain the second URL and the network address of the second terminal device that sends the HTTP access request.

507. The first server determines a leakage manner.

In this step, after parsing out the second UR L, the first server determines, based on the second indicator in the parameters carried in the second URL, that the leakage manner is mobile device copy leakage. In addition, the first server may further determine other usage information based on the parameters carried in the second URL. For example, the first server determines a name of the leaked document based on the first document identifier, and determines content of the first document based on the MD5 value.

508. The first server performs processing in the leakage manner.

Further, the step 409 described in IG. 8 may be performed. Details are not described herein again.

Compared with the foregoing embodiment in FIG. 8 that the gateway device inserts the first URL into the first document, in this embodiment, the second server inserts the second URL into the first document. In addition, in this embodiment, when the second URL is assembled, the user identifier, the source address, the destination address, the time information, and the like do not need to be obtained.

Figure 11:
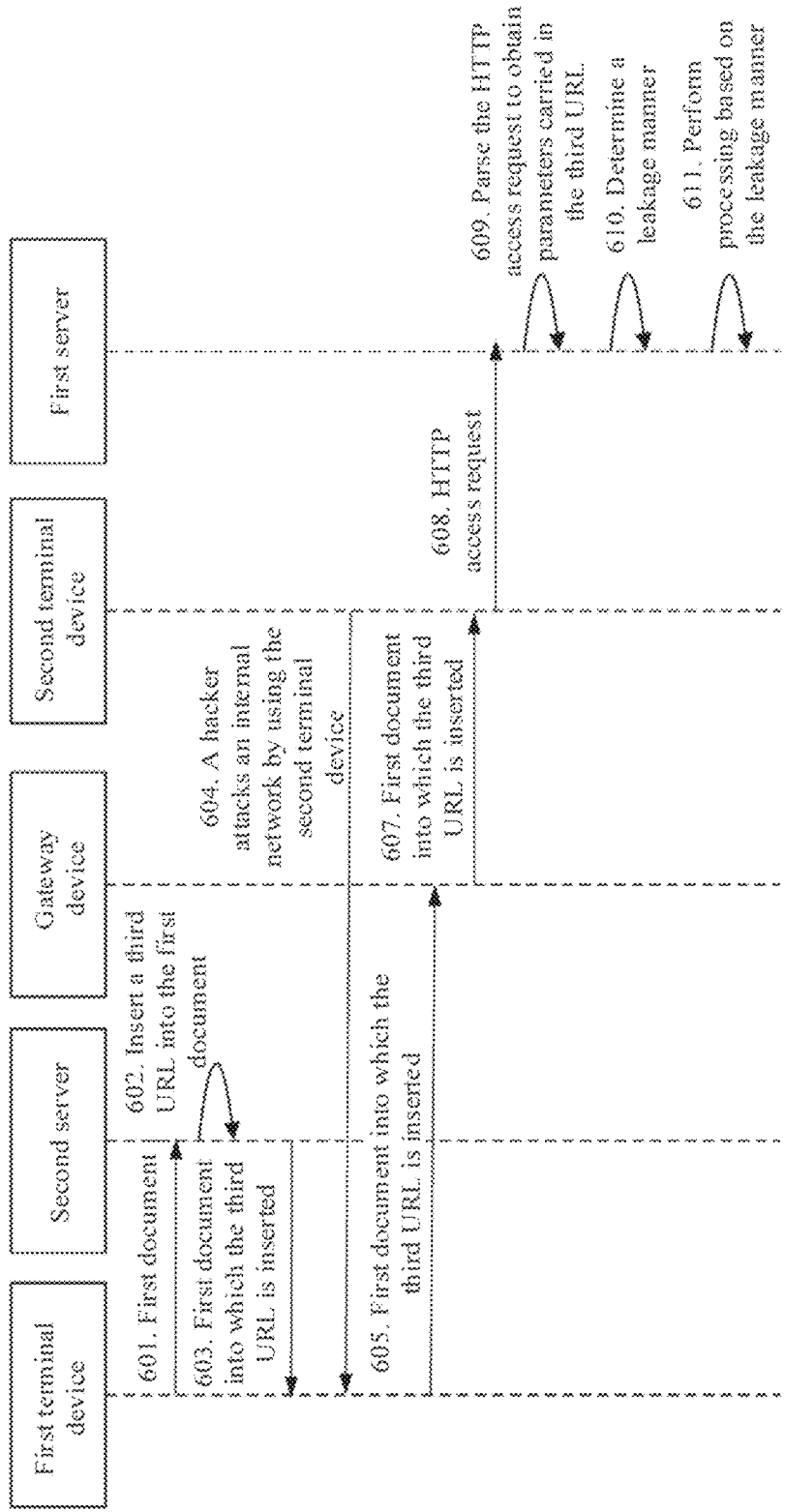
FIG. 11 is a flowchart of still another document tracking method according to an embodiment of this application.

FIG. 11 is a flowchart of still another document tracking method according to an embodiment of this application. A purpose of tracking a document leaked in a hacker attack manner is achieved in this embodiment. A scenario of this embodiment is also referred to as a honeypot scenario. Referring to FIG. 4C together, this embodiment includes the following steps.

601. A first terminal device sends a first document to a second server.

In this step, an administrator sends the first document to the second server by using the first terminal device, so as to generate a decoy document. Correspondingly, the second server receives the first document.

602. The second server inserts a third URL into the first document.

In this embodiment of this application, a document modification program or the like is configured on the second server, and by using the document modification program, a purpose of inserting the third URL into the first document can be achieved. In this step, after receiving the first document, the second server assembles the third URL, where the third (URL includes a server address of a first server and parameters, the parameters include a third indicator, a first document identifier, and an MD5 value of the first document, and the third indicator is used to indicate that a leakage manner is hacker attack leakage. The document into which the third URL is inserted is a decoy document.

603. The second server sends the first document into which the third URL is inserted to the first terminal device.

In this step, the second server publishes the first document into inserted the third URL is inserted to a terminal device in an internal device, such as the first terminal device. In specific implementation, a format of the third URL is as follows:

http://address of the first server/third indicator/parameter 1%26 parameter 2.

It is assumed that the address of the first server is ww.report.com, the third indicator is deception/report.html?, a file name is account.doc, and the MD5 value of the first document is b024455bba952abc. Then, the third URL is as follows:

http://ww.report.com/deception/
report.html?filename=account.doc %26usr=xiaomin
%26src=3234567890%26dst=565546232%26md5=
b2044556bba952abcd %26time=919642718.

604. A hacker attacks the internal network by using the second terminal device.

In this step, the second terminal device in an external network attacks the internal network.

605. The first terminal device sends the first document into which the third URL is inserted to a gateway device.

In this step, the hacker penetrates into the internal network, and sends, on the first terminal device, the first document into which the third URL is inserted to the second terminal device.

In this step, if the gateway device is the same as the gateway device in FIG. 4A, and is a device that has a function of inserting a URL into the first document, the gateway device determines whether the received document is a decoy document, and if the document is a decoy document, the gateway device does not insert the first URL into the decoy document, but directly forwards the decoy document to the second terminal device, or if the document received by the gateway device is not a decoy document, the gateway device inserts the first URL into the document. In addition, in this step, if the gateway device is not the gateway device that has a function of inserting the URL into the first document, the gateway device directly forwards the received document to the second terminal device.

606. The gateway device sends the first document into which the third URL is inserted to the second terminal device.

607. The second terminal device sends an HTTP access request to the first server.

Further, the step 406 described in FIG. 8 may be performed. Details are not described herein again.

608. The first server parses the HTTP access request to obtain the third URL and a network address.

In this step, the first server parses the HTTP access request based on the foregoing format of the third UR L to obtain the third URL and the network address of the second terminal device that sends the HTTP access request.

609. The first server determines a leakage manner.

In this step, after parsing out the third URL, the first server determines, based on the third indicator in the parameters carried in the third URL, that the leakage manner is hacker attack leakage. In addition, the first server may further determine other usage information based on the parameters carried in the third URL. For example, the first server determines a name of the leaked document based on the first document identifier, and determines content of the first document based on the MD5 value.

610. The first server performs processing in the leakage manner.

Further, the step 409 described in FIG. 8 may be performed. Details are not described herein again.

Compared with the foregoing embodiment in FIG. 8 that the gateway device inserts the first URL into the first document, in this embodiment, the second server inserts the third URL into the first document. In addition, in this embodiment, when the third URL is assembled, the user identifier, the source address, the destination address, the time information, and the like do not need to be obtained.

Compared with the foregoing embodiment shown in FIG. 10, the embodiment shown in FIG. 11 is applicable to an internal network of a company, intending to protect a sensitive file in the internal network of the company, and audit usage information of a document. This embodiment is applicable to a hacker attack, so as to discover a hacker, track the hacker, and protect the internal network.

It should be noted that, in the foregoing embodiments, the first indicator, the second indicator, or the third indicator is respectively identified by using transmit, USB, or deception as identifiers to distinguish among network propagation leakage, mobile device copy leakage, and hacker attack leakage. However, it is not limited in the embodiments of this application that in another feasible implementation, the first indicator, the second indicator, and the third indicator may be flexibly configured based on requirements.

Figure 12:
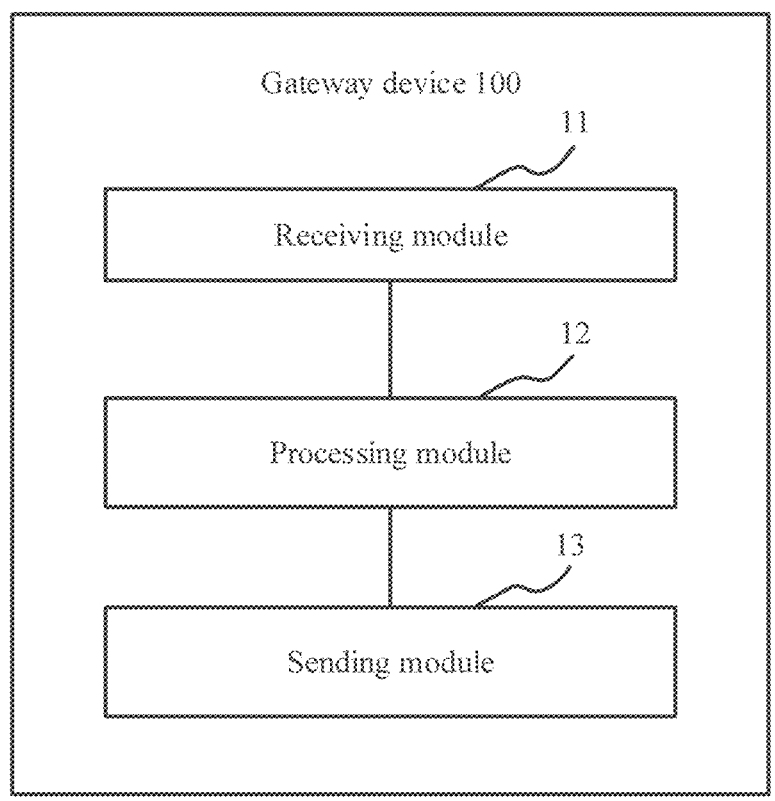
FIG. 12 is a schematic structural diagram of a gateway device according to an embodiment of this application.

FIG. 12 is a schematic structural diagram of a gateway device according to an embodiment of this application. The gateway device may be configured to execute a function of the gateway device in the foregoing method embodiment. The gateway device is located at a connection portion between the internal network and the external network. As shown in FIG. 12, optionally, the gateway device 100 includes a receiving module 11, a processing module 12, and a sending module 13.

The receiving module 11 is configured to intercept a first data flow sent from the internal network to the external network, where the first data flow is a data flow sent by a first terminal device in the internal network to a second terminal device in the external network.

The processing module 12 is configured to obtain a first document transmitted in the first data flow received by the receiving module 11, and insert a first URL into the first document, so as to obtain a second document, and replace the first document in the first data flow with the second document, so as to obtain a second data flow.

The sending module 13 is configured to send, to the second terminal device, the second data flow obtained by the processing module 12 by processing the first data flow.

In a feasible design, when inserting the first URL into the first document, so as to obtain the second document, the processing module 12 is further configured to, if the first document includes an initial URL, replace the initial URL with the first URL, so as to obtain the second document, or if the first document does not include an initial URL, add the first URL to the first document, so as to obtain the second document.

In a feasible design, the first URL includes a server address of a first server and parameters, the parameters include a first indicator, a first document identifier, and an MD5 value of the first document, and the first indicator is used to indicate that a leakage manner is network propagation leakage.

In a feasible design, the parameters further include at least one of the following information: a user identifier, a source address, a destination address, and time information, where the user identifier is a user identifier of the first terminal device, the source address is a network address of the first terminal device, the destination address is a network address of the second terminal device, and the time information is used to indicate a time point at which the second terminal device sends the first document.

In a feasible design, the first document and the second document are office documents, and the first URL is written to an associated part in a file structure of the second document.

In a feasible design, the gateway device includes any one of the following devices: a firewall, a router, or a switch.

The network device provided in this embodiment of this application may execute the foregoing method embodiment, and an implementation principle and technical effect are similar, which is not repeatedly described herein.

Figure 13:
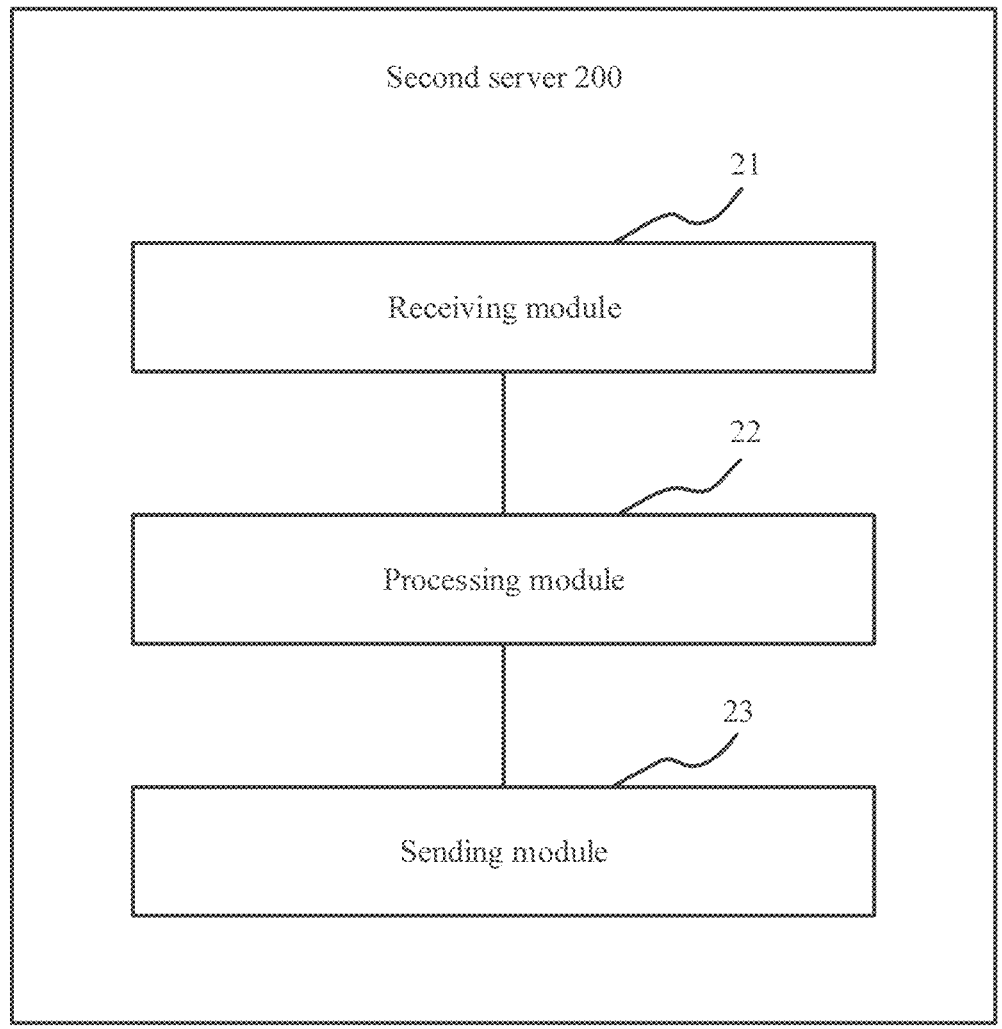
FIG. 13 is a schematic structural diagram of a second server according to an embodiment of this application.

FIG. 13 is a schematic structural diagram of a second server according to an embodiment of this application. The second server in this embodiment may be configured to execute a function of the second server in the foregoing method embodiment. Optionally, as shown in FIG. 13, the second server 200 may include a receiving module 21, a processing module 22, and a sending module 23.

The receiving module 21 is configured to receive a first document.

The processing module 22 is configured to determine a target URL based on the first document received by the receiving module 21, and insert the target URL into the first document.

The sending module 23 is configured to send the first document into which the target URL is inserted to a first terminal device.

In a feasible design, when determining the target URL based on the first document, the processing module 22 is further configured to determine a document type of the first document, where the document type includes a sensitive document and a decoy document, if the document type of the first document is a sensitive document, the target URL is a second URL, and the second URL corresponds to the sensitive document, or if the document type of the first document is a decoy document, the target URL is a third URL, and the third URL corresponds to the decoy document.

In a feasible design, the second URL includes a server address of a first server and parameters, the parameters include a second indicator, a first document identifier, and an MD5 value of the first document, and the second indicator is used to indicate that a leakage manner is mobile device copy leakage.

In a feasible design, the third URL includes a server address of a first server and parameters, the parameters include a third indicator, a first document identifier, and an MD5 value of the first document, and the third indicator is used to indicate that a leakage manner is hacker attack leakage.

In a feasible design, the first document is an office document, and the target URL is written to an associated part of the first document.

The base station provided in this embodiment of this application may execute the foregoing method embodiment, and an implementation principle and technical effect are similar, which is not repeatedly described herein.

Figure 14:
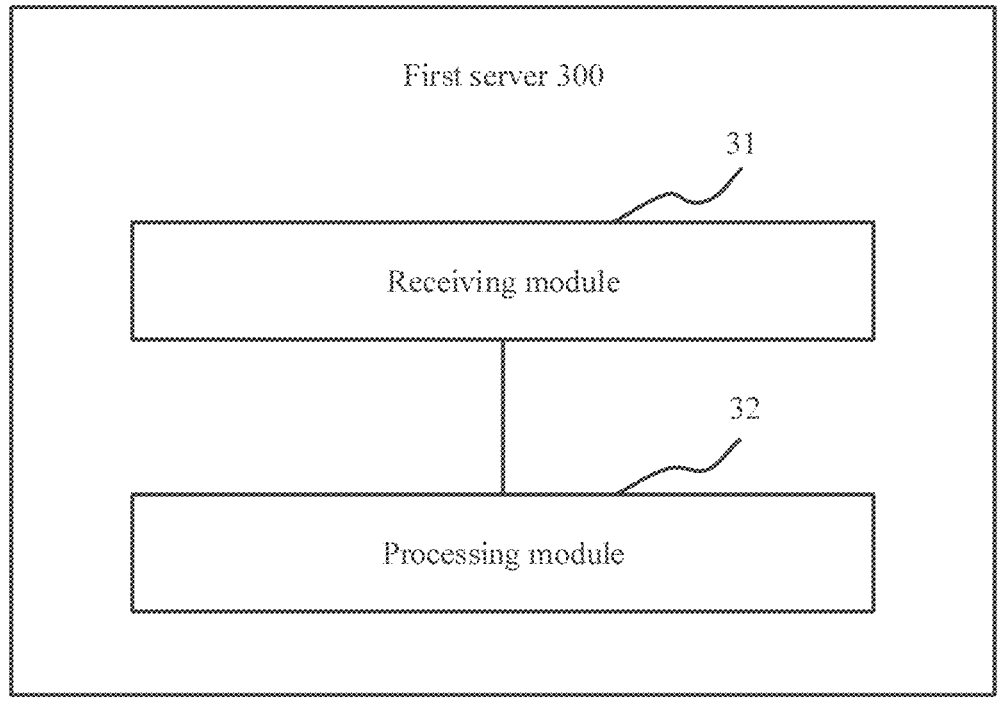
FIG. 14 is a schematic structural diagram of a first server according to an embodiment of this application.

FIG. 14 is a schematic structural diagram of a first server according to an embodiment of this application. The first server may be configured to execute a function of the first server in the foregoing method embodiment. Optionally, as shown in FIG. 14, the first server 300 includes a receiving module 31 and a processing module 32.

The receiving module 31 is configured to receive an HTTP access request sent by a first terminal device, where the HTTP) access request includes a network address of the first terminal device and a target URL.

The processing module 32 is configured to parse the HTTP access request received by the receiving module 31 to obtain the target URL and the network address, determine a target leakage manner based on the target URL and stored correspondence information, where the correspondence information stores a correspondence between the target URL and the target leakage manner, and determine that a document into which the target URL is inserted is transmitted in the target leakage manner to a terminal device that uses the network address.

In a feasible design, when determining the target leakage manner based on the target URL and the stored correspondence information, the processing module 32 is further configured to, when the target URL is a first URL, determine that the target leakage manner is a network propagation manner corresponding to the first URL, where the first URL includes a server address and parameters, the parameters include a first indicator, a first document identifier, and an MD5 value of the first document, and the first indicator is used to indicate that a leakage manner is network propagation leakage.

In a feasible design, when determining the target leakage manner based on the target URL and the stored correspondence information, the processing module 32 is further configured to, when the target URL is a second URL, determine that the target leakage manner is a mobile device propagation manner corresponding to the second URL, where the second URL includes a server address and parameters, the parameters include a second indicator, a first document identifier, and an MD5 value of the first document, and the second indicator is used to indicate that a leakage manner is mobile device copy leakage.

In a feasible design, when determining the target leakage manner based on the target URL and the stored correspondence information, the processing module 32 is further configured to, when the target URL is a third URL, determine that the target leakage manner is a hacker attack manner corresponding to the third URL, where the third URL includes a server address and parameters, the parameters include a third indicator, a first document identifier, and an MD5 value of the first document, and the third indicator is used to indicate that a leakage manner is hacker attack leakage.

In a feasible design, the first document is an office document, and the target URL is written to an associated part of the first document.

The base station provided in this embodiment of this application may execute the foregoing method embodiment, and an implementation principle and technical effect are similar, which is not repeatedly described herein.

Figure 15:
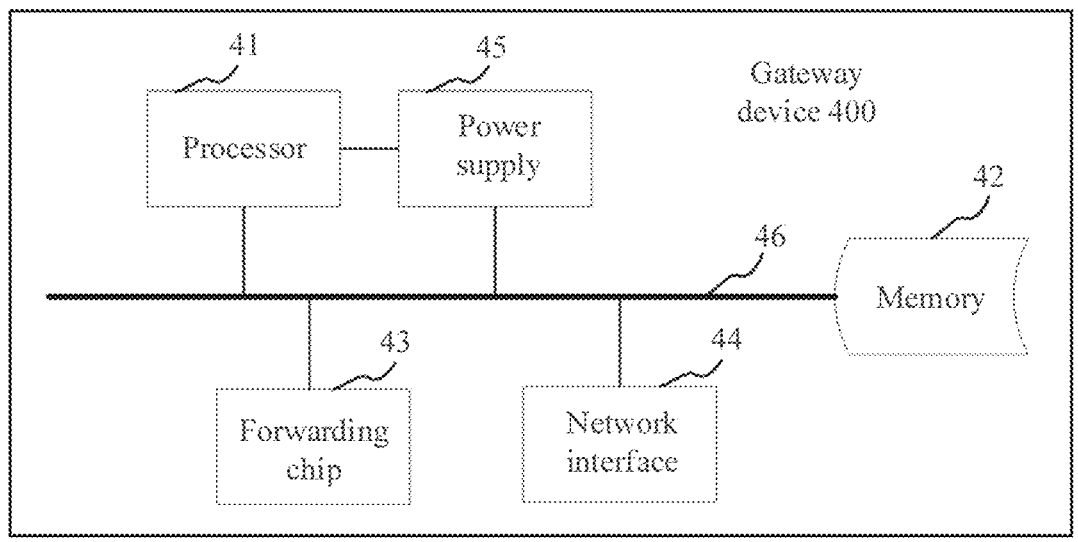
FIG. 15 is a schematic structural diagram of a gateway device according to an embodiment of this application.

FIG. 15 is a schematic structural diagram of a gateway device according to an embodiment of this application. Optionally, as shown in FIG. 15, the gateway device 400 may include a processor 41 (for example, a central processing unit (CPU)), a memory 42, a forwarding chip 43, and a network interface 44. The processor 41 is configured to execute an instruction in the memory 42 to determine whether a first data flow is a data flow sent from an internal network to an external network. If a direction of the first data flow is sent from the internal network to the external network, the processor 41 executes the instruction to control the network interface 44 to intercept the first data flow sent from the internal network to the external network, and further control the forwarding chip to obtain a first document transmitted in the first data flow, inserts a first URL into the first document, so as to obtain a second document, replaces the first document in the first data flow with the second document, so as to obtain a second data flow, and sends the second data flow to a second terminal device by using the network interface 44. The memory 42 may include a random-access memory (RAM), or may be a non-volatile memory, for example, at least one magnetic disk memory. The memory 42 may store various instructions, so as to complete various processing functions and implement the method steps of this application. Optionally, the gateway device in this application may further include a power supply 45 or a communications bus 46. The communications bus 46 is configured to implement a communication connection between elements. The bus may be classified into an address bus, a data bus, a control bus, and the like. For ease of representation, only one thick line is used to represent the bus in the figure, but this does not mean that there is only one bus or only one type of bus.

In this embodiment of this application, the memory 42 is configured to store computer executable program code, where the program code includes an instruction. When the processor 41 executes the instruction, the processor 41 of the gateway device performs a processing action of the gateway device in the foregoing method embodiment, and the forwarding chip 43 performs an action of modifying and sending a document of the gateway device in the foregoing embodiment or the optional embodiment. Implementation principles and technical effects are similar, and are not described herein again.

Figure 16:
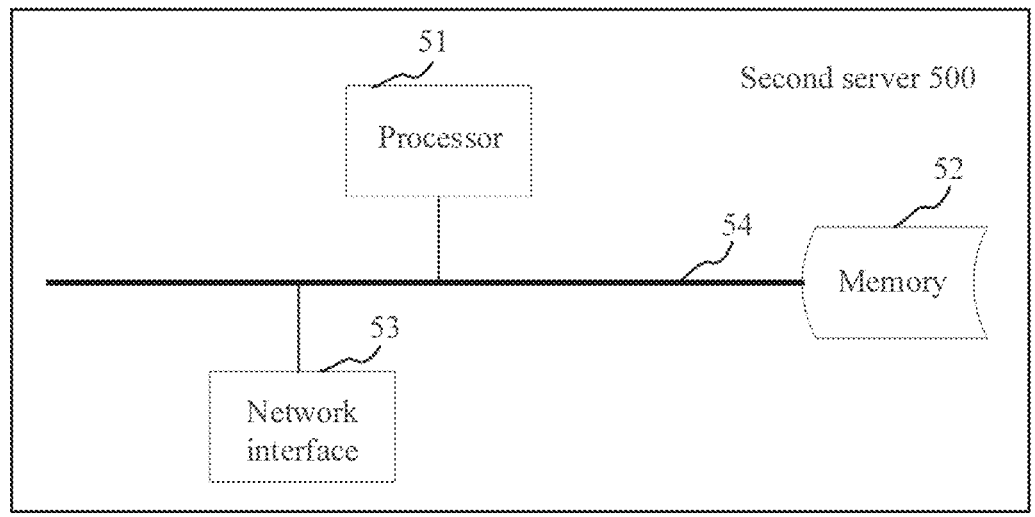
FIG. 16 is a schematic structural diagram of a second server according to an embodiment of this application.

FIG. 16 is a schematic structural diagram of a second server according to an embodiment of this application. Optionally, as shown in FIG. 16, the second server 500 includes a processor 51 (for example, a CPU), a memory 52, and a network interface 53. The processor 51 is configured to execute an instruction in the memory 52, receive a first document by using the network interface 53, determine a target URL based on the first document, insert the target URL into the first document, and send the first document into which the target URL is inserted to a first terminal device by using the network interface 53. The memory 52 may include a high-speed RAM, and may further include a non-volatile memory (NVM), for example, at least one disk memory. The memory 52 may store various instructions, so as to complete various processing functions and implement the method steps of this application. Optionally, the second server in this application may further include a communications bus 54. The communications bus 54 is configured to implement a communication connection between elements. The network interface 53 is configured to implement connection and communication between the second server and another peripheral.

In this embodiment of this application, the memory 52 is configured to store computer executable program code, where the program code includes an instruction. When the processor 51 executes the instruction, the processor 51 of the second server performs a processing action of the second server in the foregoing embodiment or the optional embodiment, and the network interface 53 performs a receiving action of the second server in the foregoing method embodiment. Implementation principles and technical effects are similar, and are not described herein again. The bus may be classified into an address bus, a data bus, a control bus, and the like. For ease of representation, only one thick line is used to represent the bus in the figure, but this does not mean that there is only one bus or only one type of bus.

Figure 17:
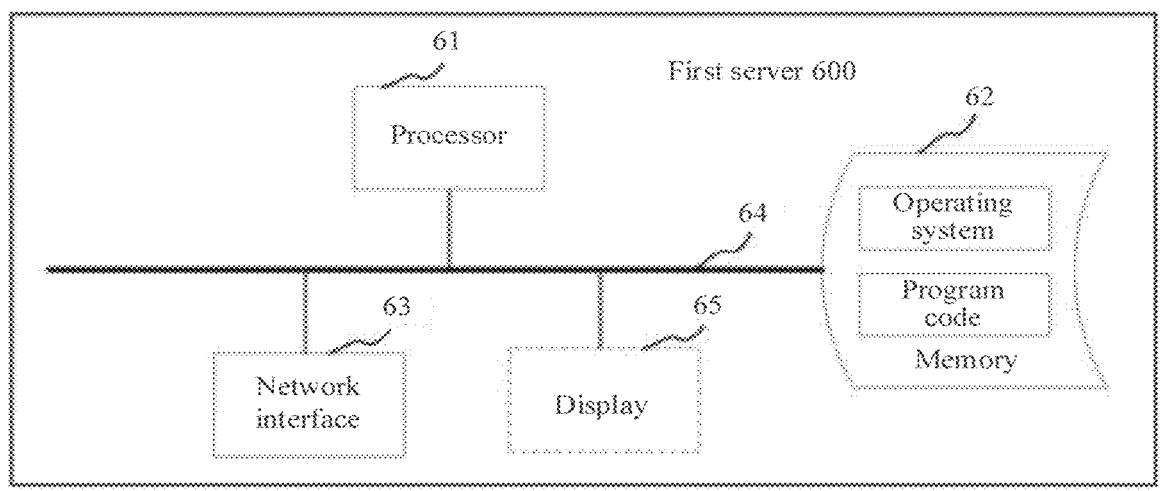
FIG. 17 is a schematic structural diagram of a first server according to an embodiment of this application.

FIG. 17 is a schematic structural diagram of a first server according to an embodiment of this application. Optionally, as shown in FIG. 17, the first server 600 may include a processor 61 (for example, a CPU), a memory 62, and a network interface 63. The processor 61 is configured to execute program code in the memory 62, receive, by using the network interface 63, an HTTP access request sent by a second terminal device, parse the HTTP access request to obtain a target URL and the network address, determine a target leakage manner based on the target URL and stored correspondence information, and determine that a document into which the target URL is inserted is transmitted in the target leakage manner to a terminal device that uses the network address. The memory 62 may include a high-speed RAM, and may further include an NVM, for example, at least one disk memory. The memory 62 may store program code and an operating system, so as to complete various processing functions and implement the method steps of this application. Optionally, the first server in this application may further include a communications bus 64 or a display 65. The communications bus 64 is configured to implement a communication connection between elements. The bus may be classified into an address bus, a data bus, a control bus, and the like. For case of representation, only one thick line is used to represent the bus in the figure, but this does not mean that there is only one bus or only one type of bus. After identifying the leakage manner, the processor 61 sends notification information to an administrator by using the network interface 63, receives, by using the network interface 63, information replied by the administrator, and displays the information on the display 65.

In this embodiment of this application, the memory 62 is configured to store computer executable program code. When the processor 61 executes the program code, the processor 61 of the first server performs a processing action of the first server in the foregoing embodiment or the optional embodiment, and the network interface 63 performs a receiving action of the first server in the foregoing method embodiment. Implementation principles and technical effects are similar, and are not described herein again. The bus may be classified into an address bus, a data bus, a control bus, and the like. For ease of representation, only one thick line is used to represent the bus in the figure, but this does not mean that there is only one bus or only one type of bus.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, digital versatile disc (DVD)), a semiconductor medium (for example, a solid-state disk (SSD)), or the like.

It may be understood that, various numerals in the embodiments of this application are used for distinguishing for ease of description, and are not intended to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A gateway device comprising:
   a network interface configured to intercept a first data flow from an internal network to an external network, wherein the first data flow is from a first terminal device in the internal network to a second terminal device in the external network;
   a memory configured to store instructions; and
   a processor coupled to the memory and configured to execute the instructions to cause the gateway device to:
   obtain a first document in the first data flow, wherein the first document is associated with a document type that comprises a decoy document;
   insert a first Uniform Resource Locator (URL) into an associated part of the first document to obtain a second document, wherein the first URL comprises a server address of a server, and wherein the first URL of the associated part is configured to be accessed by another terminal device when the second document is opened, and wherein the first URL corresponds to the decoy document when the document type is the decoy document; and
   replace the first document in the first data flow with the second document to obtain a second data flow,
   wherein the network interface is further configured to send, to the second terminal device, the second data flow.

2. The gateway device of claim 1, wherein the instructions further cause the gateway device to:
   replace an initial URL of the first document with the first URL to obtain the second document when the first document comprises the initial URL; and
   add the first URL to the first document to obtain the second document when the first document does not comprise the initial URL.

3. The gateway device of claim 2, wherein the first URL comprises parameters, and wherein the parameters comprise:
   an indicator indicating that a leakage manner is a network propagation leakage; and
   a first document identifier identifying the first document.

4. The gateway device of claim 3, wherein the first URL further comprises a message digest algorithm (MD5) value of the first document.

5. The gateway device of claim 1, wherein the parameters comprise:
- an indicator indicating that a leakage manner is a network propagation leakage; and
- a first document identifier identifying the first document.

6. The gateway device of claim 5, wherein the first URL further comprises a message digest algorithm (MD5) value of the first document.

7. The gateway device of claim 5, wherein the parameters further comprise at least one of:
- a user identifier of the first terminal device;
- a source address that is a first network address of the first terminal device;
- a destination address that is a second network address of the second terminal device; or
- time information that indicates a time point at which the first terminal device sends the first document.

8. A second server comprising:
- a network interface configured to receive a first document;
- a memory configured to store instructions; and
- a processor coupled to the memory and configured to execute the instructions that cause the second server to: a target Uniform Resource Locator (URL) into an associated part of the first document to obtain a second document, wherein the first document is associated with a document type that comprises a decoy document, wherein the target URL is based on the document type, wherein the target URL is a second URL corresponding to the decoy document when the document type is the decoy document, wherein the target URL comprises a server address of a first server, wherein the target URL of the associated part is configured to be accessed by another terminal device when the second document is opened, and wherein the network interface is further configured to send the second document to a first terminal device.

9. The second server of claim 8, wherein the document type comprises a sensitive document, and wherein the instructions further cause the second server to determine that the target URL is a first URL corresponding to the sensitive document when the document type is the sensitive document.

10. The second server of claim 9, wherein the first URL comprises parameters, and wherein the parameters comprise:
- a first indicator indicating that a leakage manner is a mobile device copy leakage; and
- a first document identifier identifying the first document.

11. The second server of claim 10, wherein the first URL further comprises a message digest algorithm (MD5) value of the first document.

12. The second server of claim 10, wherein the second URL comprises the server address of the first server and the parameters, and wherein the parameters further comprise a second indicator indicating that the leakage manner is a hacker attack leakage.

13. The second server of claim 12, wherein the second URL further comprises a message digest algorithm (MD5) value of the first document.

14. A method, comprising:
- intercepting a first data flow from a first terminal device in an internal network to a second terminal device in an external network;
- obtaining a first document in the first data flow, wherein the first document is associated with a document type that comprises a decoy document;
- inserting a first Uniform Resource Locator (URL) into the first document to obtain a second document, wherein the first URL comprises a message digest algorithm (MD5) value of the first document, and wherein the first URL corresponds to the decoy document when the document type is the decoy document;
- replacing the first document in the first data flow with the second document to obtain a second data flow; and
- sending the second data flow to the second terminal device.

15. The method of claim 14, further comprising replacing an initial URL of the first document with the first URL to obtain the second document when the first document comprises the initial URL.

16. The method of claim 14, further comprising adding the first URL to the first document to obtain the second document when the first document does not comprise an initial URL.

17. The method of claim 15, wherein the first URL further comprises a server address of a server and parameters, and wherein the parameters comprise:
- an indicator indicating that a leakage manner is a network propagation leakage; and
- a first document identifier identifying the first document.

18. The method of claim 17, wherein the parameters further comprise a user identifier of the first terminal device.

19. The method of claim 17, wherein the parameters further comprise a source address that is a first network address of the first terminal device.

20. The method of claim 17, wherein the parameters further comprise a destination address that is a second network address of the second terminal device.

* * * * *

UNITED STATES PATENT AND TRADEMARK OFFICE
CERTIFICATE OF CORRECTION

| | |
|---|---|
| PATENT NO. | : 12,137,079 B2 |
| APPLICATION NO. | : 17/225538 |
| DATED | : November 5, 2024 |
| INVENTOR(S) | : Jingyun Cao and Wenqing Yang |

Page 1 of 1

It is certified that error appears in the above-identified patent and that said Letters Patent is hereby corrected as shown below:

In the Claims

Claim 8, Column 27, Line 26: "a target" should read "insert a target"

Signed and Sealed this
Third Day of December, 2024

Katherine Kelly Vidal
Director of the United States Patent and Trademark Office